(12) United States Patent
Park et al.

(10) Patent No.: US 12,089,793 B2
(45) Date of Patent: Sep. 17, 2024

(54) AUTONOMOUSLY TRAVELING MOBILE ROBOT AND TRAVELING CONTROL METHOD THEREFOR

(71) Applicant: YUJIN ROBOT CO., LTD., Incheon (KR)

(72) Inventors: Seong Ju Park, Gunpo (KR); Gi Yeon Park, Incheon (KR); Ki San Hwang, Gunpo (KR); Seung Ho Jang, Incheon (KR)

(73) Assignee: YUJIN ROBOT CO., LTD., Incheon (KR)

( * ) Notice: Subject to any disclaimer, the term of this patent is extended or adjusted under 35 U.S.C. 154(b) by 670 days.

(21) Appl. No.: 17/311,358

(22) PCT Filed: Dec. 6, 2019

(86) PCT No.: PCT/KR2019/017186
§ 371 (c)(1),
(2) Date: Jun. 7, 2021

(87) PCT Pub. No.: WO2020/116986
PCT Pub. Date: Jun. 11, 2020

(65) Prior Publication Data
US 2022/0022715 A1    Jan. 27, 2022

(30) Foreign Application Priority Data

Dec. 7, 2018  (KR) .................. 10-2018-0156943
Jul. 17, 2019  (KR) .................. 10-2019-0086265
Sep. 30, 2019  (KR) .................. 10-2019-0120981

(51) Int. Cl.
*A47L 11/40*  (2006.01)
*G05D 1/00*  (2006.01)

(52) U.S. Cl.
CPC ........ *A47L 11/4011* (2013.01); *G05D 1/0223* (2013.01); *G05D 1/0238* (2013.01); *G05D 1/0272* (2013.01); *A47L 2201/04* (2013.01)

(58) Field of Classification Search
CPC ............. A47L 11/4011; A47L 2201/04; A47L 9/2826; A47L 9/2852; A47L 11/4061;
(Continued)

(56) References Cited

U.S. PATENT DOCUMENTS 4,878,003 A * 10/1989 Knepper .............. G05D 1/0255
                                                    318/587
6,076,025 A *  6/2000 Ueno .................... G05D 1/0238
                                                    701/25
(Continued)

FOREIGN PATENT DOCUMENTS

JP       2012190405 A   10/2012
KR    1020060081131 A    7/2006
(Continued)

OTHER PUBLICATIONS

K. M. Hasan, Abdullah-Al-Nahid and K. J. Reza, "Path planning algorithm development for autonomous vacuum cleaner robots," 2014 International Conference on Informatics, Electronics & Vision (ICIEV), Dhaka, Bangladesh, 2014, pp. 1-6. (Year: 2014).*
(Continued)

*Primary Examiner* — Dino Kujundzic
(74) *Attorney, Agent, or Firm* — BROADVIEW IP LAW, PC

(57) ABSTRACT

Disclosed are an autonomously traveling mobile robot and a traveling control method thereof, which can control the traveling of the mobile robot according to a first traveling mode in which the mobile robot travels by following obstacles located around the mobile robot or a second traveling mode in which the mobile robot travels in consid-
(Continued)

eration of a positional relation with an existing traveling trajectory through which the mobile robot has already traveled, and generate candidate spots where the mobile robot can travel while the mobile robot travels along the traveling trajectory to implement a spiral cleaning pattern.

17 Claims, 19 Drawing Sheets

(58) Field of Classification Search
 CPC .. G05D 1/0223; G05D 1/0238; G05D 1/0272; G05D 1/0219; B25J 9/16; B25J 11/00; B25J 19/02
 See application file for complete search history.

(56) References Cited

U.S. PATENT DOCUMENTS

| | | | | |
|---|---|---|---|---|
| 6,590,222 B1* | 7/2003 | Bisset | ............ | G01S 3/782 |
| | | | | 250/221 |
| 6,809,490 B2* | 10/2004 | Jones | ............ | G05D 1/0219 |
| | | | | 318/568.17 |
| 10,045,675 B2* | 8/2018 | Haegermarck | ...... | G05D 1/0248 |
| 2004/0207355 A1 | 10/2004 | Jones et al. | | |
| 2005/0197757 A1* | 9/2005 | Flann | ............ | G05D 1/0219 |
| | | | | 701/50 |
| 2006/0237037 A1* | 10/2006 | Kim | ............ | G05D 1/0219 |
| | | | | 134/21 |
| 2009/0281661 A1 | 11/2009 | Dooley et al. | | |
| 2011/0118928 A1* | 5/2011 | Yoo | ............ | A47L 9/2894 |
| | | | | 701/25 |
| 2011/0202175 A1* | 8/2011 | Romanov | ......... | A47L 11/4091 |
| | | | | 700/250 |
| 2011/0226282 A1* | 9/2011 | Choi | ............ | A47L 9/009 |
| | | | | 134/18 |
| 2017/0297455 A1 | 10/2017 | Romanov et al. | | |
| 2017/0332862 A1* | 11/2017 | Jun | ............ | A47L 9/30 |
| 2020/0047337 A1* | 2/2020 | Williams | ............ | B25J 9/1676 |
| 2021/0145234 A1* | 5/2021 | Landry | ............ | G05D 1/0272 |
| 2021/0154840 A1* | 5/2021 | Vogel | ............ | B25J 9/1666 |

FOREIGN PATENT DOCUMENTS

| | | |
|---|---|---|
| KR | 1020090017191 A | 2/2009 |
| KR | 1020140055134 A | 5/2014 |
| KR | 1020160100950 A | 8/2016 |
| KR | 1020170043946 A | 4/2017 |
| WO | 2018/101631 A2 | 6/2018 |

OTHER PUBLICATIONS

Extended European Search Report for EP19893670 by European Patent Office dated Jul. 14, 2022.

* cited by examiner

AUTONOMOUSLY TRAVELING MOBILE ROBOT AND TRAVELING CONTROL METHOD THEREFOR

TECHNICAL FIELD

The present invention relates to a traveling control method of a mobile robot, and more particularly, to an autonomously traveling mobile robot and a traveling control method thereof.

BACKGROUND ART

In general, robots have been developed for industrial use and have been responsible for part of factory automation. In recent years, as the field of application of robots has been further expanded, medical robots, aerospace robots, etc. are being developed, and household robots that may be used in general homes are also being made.

A typical example of the household robot may include a cleaning robot. In this case, the cleaning robot refers to a device that automatically cleans an area to be cleaned by sucking foreign substances such as dust from a floor while traveling the area by itself. Such a cleaning robot detects obstacles, or the like located in the cleaning area through various sensors, etc., and controls a traveling trajectory and a cleaning operation of the cleaning robot by using the detection result.

The existing cleaning pattern puts a lot of loads on the movement of the robot and includes a lot of abrupt motions that require a 180° change of direction, so the load on the movement of the robot is large and the time consumption is large while traveling.

DISCLOSURE

Technical Problem

The present invention relates to an autonomously traveling mobile robot and a traveling control method thereof, and an object of the present invention is to control traveling of a mobile robot according to a first traveling mode in which the mobile robot travels by following obstacles located around the mobile robot or a second traveling mode in which the mobile robot travels in consideration of a positional relation with an existing traveling trajectory through which the mobile robot has already traveled, and generate candidate spots where the mobile robot may travel while the mobile robot travels along the traveling trajectory to implement a spiral cleaning pattern.

Another object of the present invention is to reduce a cleaning time of autonomously traveling mobile robot and increase energy efficiency by applying a cleaning pattern capable of reducing a 180° turn that puts a load on the autonomously traveling mobile robot.

Other objects not specified in the present invention may be additionally considered within the scope that can be easily inferred from the following detailed description and effects thereof.

Technical Solution

A traveling control method of an autonomously traveling mobile robot includes: controlling, by a traveling control apparatus, traveling of the mobile robot according to a first traveling mode in which the mobile robot travels by following obstacles located around the mobile robot or a second traveling mode in which the mobile robot travels in consideration of a positional relation of an existing traveling trajectory through which the mobile robot has already traveled; and generating candidate spots where the mobile robot may travel while the mobile robot travels along a traveling trajectory.

The traveling control method further includes: when a current location of the mobile robot is included in the existing trajectory through which the mobile robot has already traveled or when the obstacle being followed is not detected, controlling, by the traveling control apparatus, the traveling of the mobile robot according to a third traveling mode that determines the traveling trajectory of the mobile robot in consideration of the generated candidate spots.

In the controlling of the traveling of the mobile robot according to the first traveling mode, when the obstacle is detected at a distance closer than a preset distance from a front of the mobile robot, the traveling of the mobile robot may be controlled to rotate by reducing a speed of the mobile robot or adjusting a radius of curvature of the mobile robot.

In the controlling of the traveling of the mobile robot according to the first traveling mode, when the obstacle is detected at a distance closer than a preset distance from one side of the mobile robot, the traveling of the mobile robot may be controlled to rotate so that the obstacle is located on an opposite side of the mobile robot from the one side.

In the controlling of the traveling of the mobile robot according to the first traveling mode, when the obstacle that the mobile robot follows is discontinuously detected, the traveling of the mobile robot may be controlled to travel in consideration of a distance between the obstacle being followed and the mobile robot and a distance between two wheels of the mobile robot.

The generating of the candidate spots where the mobile robot may travel includes: selecting the candidate spots using wheel encoder information according to a rotation of a main wheel for traveling the mobile robot and a distance between a center of the mobile robot and the main wheel; and accumulating and storing the selected candidate spots according to a predetermined criterion.

In the accumulating and storing of the selected candidate spots according to the predetermined criterion, candidate spots excluding candidate spots which overlap the obstacle or are included in the existing trajectory through which the mobile robot has already traveled from the candidate spots are stored.

The controlling of the traveling of the mobile robot according to the third traveling mode includes selecting candidate spots closest to the mobile robot among the generated candidate spots and controlling the mobile robot to travel to the candidate spots.

In the controlling of the traveling trajectory of the mobile robot according to the second traveling mode, the traveling of the mobile robot is controlled so that the trajectory according to the first traveling mode in which the mobile robot has already traveled and an overlap according to a predetermined criterion are generated.

An autonomously traveling mobile robot according to the embodiment of the present invention includes: a sensor unit configured to detect an obstacle located around the mobile robot; a traveling control unit configured to control traveling of the mobile robot according to a first traveling mode in which the mobile robot follows the obstacle located around the mobile robot or a second traveling mode in which the mobile robot travels in consideration of a positional relation with an existing traveling trajectory through which the mobile robot has already traveled, and generate candidate spots where the mobile robot may travel while the mobile robot travels along the traveling trajectory; and a driving unit configured to drive the mobile robot according to a traveling command of the traveling control unit.

When a current location of the mobile robot is included in the existing trajectory through which the mobile robot has already traveled or when the obstacle being followed is not detected, the traveling of the mobile robot may be controlled, by the traveling control unit, according to a third traveling mode that determines the traveling trajectory of the mobile robot in consideration of the generated candidate spots.

When the obstacle is detected at a distance closer than a preset distance from a front of the mobile robot, the traveling control unit controls the traveling of the mobile robot to rotate by reducing a speed of the mobile robot or adjusting a radius of curvature of the mobile robot, and when the obstacle is detected at a distance closer than a preset distance from one side of the mobile robot, the traveling control unit controls the traveling of the mobile robot to rotate so that the obstacle is located on an opposite side of the mobile robot from the one side.

The traveling control unit selects the candidate spots using wheel encoder information according to a rotation of a main wheel for traveling the mobile robot and a distance between a center of the mobile robot and the main wheel and accumulates and stores the selected candidate spots according to a predetermined criterion.

The traveling control unit controls the traveling of the mobile robot so that the trajectory according to the first traveling mode in which the mobile robot has already traveled and an overlap according to a predetermined criterion are generated.

According to another aspect of the present embodiment, a computer-readable recording medium recorded with a program for executing a traveling control method of an autonomously traveling mobile robot on a computer is provided.

Advantageous Effects

As described above, according to the embodiments of the present invention, it is possible to control traveling of a mobile robot according to a first traveling mode allowing traveling in which obstacles positioned adjacently to the mobile robot are followed or a second traveling mode allowing traveling in consideration of a positional relation with an existing traveling trajectory through which the mobile robot has already traveled, and generate candidate spots at which the mobile robot may travel while the mobile robot travels along the traveling trajectory to implement a spiral cleaning pattern.

In addition, it is possible to reduce a cleaning time of autonomously traveling mobile robot and increase energy efficiency by applying a cleaning pattern capable of reducing a 180° turn that puts a load on the autonomously traveling mobile robot.

Even if effects are not explicitly mentioned herein, the effects described in the following specification expected by the technical features of the present invention and their potential effects are treated as described in the specification of the present invention.

BEST MODE

Figure 1:
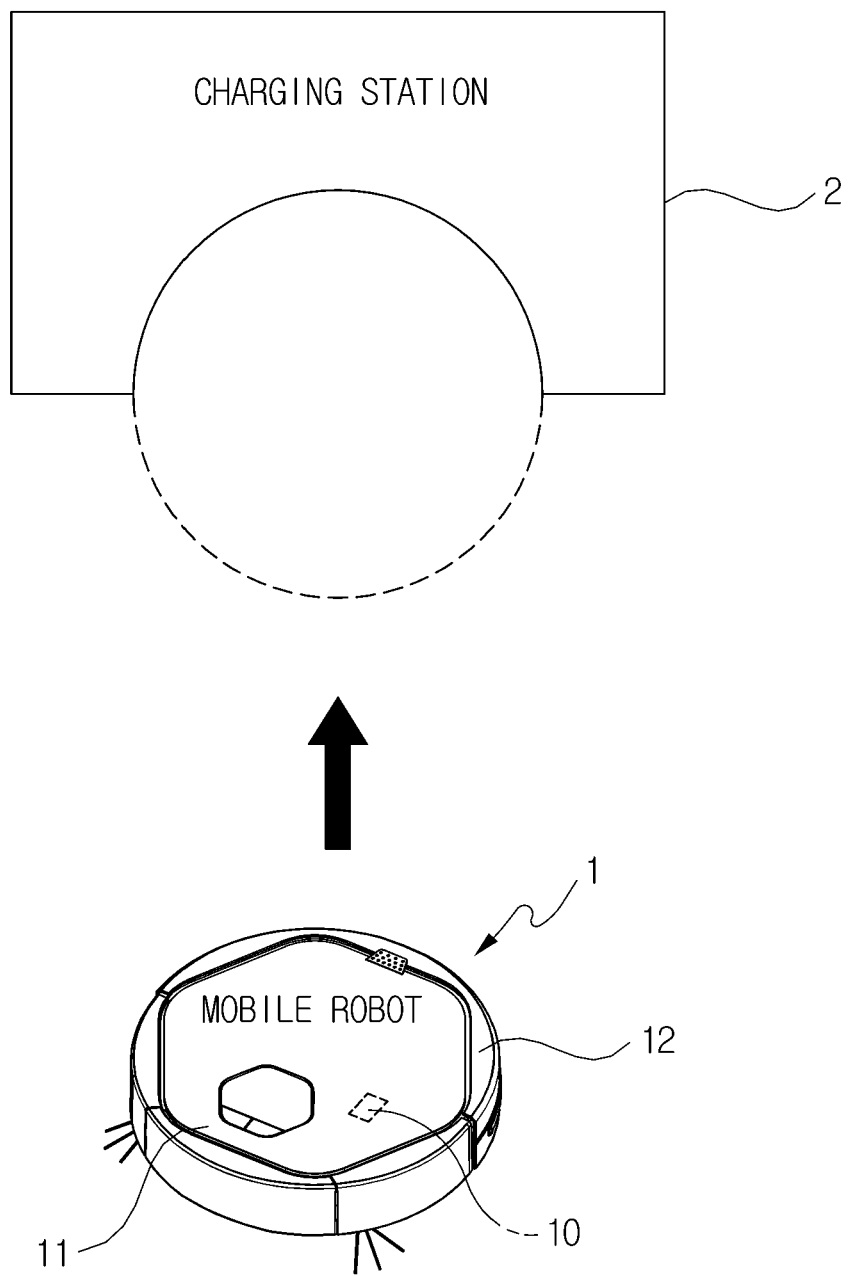
FIG. 1 is a diagram schematically illustrating a system of an autonomously traveling mobile robot according to an embodiment of the present invention.

Hereinafter, an autonomously traveling mobile robot and a traveling control method thereof related to the present invention will be described in more detail with reference to the accompanying drawings. However, the present invention may be implemented in several different forms and is not limited to exemplary embodiments provided in the present specification. In addition, in order to clearly describe the present invention, portions that are not associated with a description will be omitted, and the same components will be denoted by the same reference numerals.

It is to be understood that when one component is referred to as being "connected to" or "coupled to" another component, one component may be connected directly to or coupled directly to another component or be connected to or coupled to another component with the other component interposed therebetween.

In addition, terms "module" and "unit" for components used in the following description are given or used interchangeably only to easily make the specification. Therefore, these terms do not have meanings or roles that distinguish from each other in themselves.

Terms 'first', 'second', and the like, may be used to describe various components, but the components are not to be construed as being limited by the terms. The terms are used only to distinguish one component from another component.

The present invention relates to an autonomously traveling mobile robot and a traveling control method thereof.

FIG. 1 is a diagram schematically illustrating a system of an autonomously traveling mobile robot according to an embodiment of the present invention.

As illustrated in FIG. 1, the autonomously traveling mobile robot system according to an embodiment of the present invention may include an autonomously traveling mobile robot 1 and a docking station 2 for charging the mobile robot.

The autonomously traveling mobile robot 1 refers to a travelable cleaning robot. For example, the autonomously traveling mobile robot 1 may automatically perform cleaning while traveling in predetermined spaces, such as a house, a public institution, and a company.

The autonomously traveling mobile robot 1 includes an internally or externally mounted LiDAR 11 and an image information acquisition unit 12.

The image information acquisition unit 12 may include various sensors such as a camera, a laser scanner, and an ultrasonic sensor, and may generate maps for the entire area to be cleaned while traveling in predetermined spaces, such as a house, a public institution, and a company, based on the acquired data and automatically clean the areas to be cleaned by sucking foreign substances such as dust from a floor while traveling in the area to be cleaned by itself without user's manipulation based on the previously generated maps.

A traveling control apparatus 10 of the autonomously traveling mobile robot according to the embodiment of the present invention is implemented as a processor in the autonomously traveling mobile robot 1, and may use environmental information acquired by the LiDAR 11 and the image information acquisition unit 12 and include a memory that stores environmental information already acquired while traveling and traveling map information generated in association with a traveling area in which the autonomously traveling mobile robot has traveled.

Here, the driving map information includes a plurality of nodes and links constituting a traveling map related to the traveling area, and the environment information is obtained from image information on the traveling area acquired while traveling and distance information and reflected light information extracted three-dimensional-based point cloud data acquired from the external LiDAR.

At this time, the autonomously traveling mobile robot 1 may generate a map using, for example, simultaneous localization and mapping (SLAM) technology. Here, the SLAM technology refers to a technology for complementing each other by simultaneously performing location identification and map construction beyond the technology for recognizing a location with the existing map or making a map by knowing a location.

The autonomously traveling mobile robot 1 automatically performs cleaning while autonomously traveling in an area to be cleaned and then travels to the docking station 2 for charging and emptying the dust stored in the robot cleaner.

A signal processing unit (not illustrated) determines a traveling mode or a traveling trajectory of the autonomously traveling mobile robot using the environmental information acquired from the image information acquisition unit 12, and processes operations and user commands related to the traveling area.

The docking station 2 transmits a docking guidance signal forward. Then, when the autonomously traveling mobile robot 1 is docked according to the transmitted docking guidance signal, the docking station 2 may charge the docked autonomously traveling mobile robot 1.

In this case, when the mobile robot starts charging at the docking station, the docking station 2 may stop or block the transmission of the docking guidance signal for guiding the mobile robot.

The docking station 2 normally not only performs a function of transmitting a signal that allows the mobile robot to be smoothly guided to the docking station, but also performs a function of supplying power by connecting an external power supply to the mobile robot when the mobile robot is connected, a function of displaying a status of whether a user has turned on a power supply, the mobile robot is charging, or is fully charged, a function of transmitting a guidance signal, displaying a status, supplying external power, or the like using power of a power supplier, a function of receiving power from an external AC input and converting the AC power into power for docking station operation, or the like.

In addition, the docking station 2 may block a charging status display on a status display unit when the autonomously traveling mobile robot 1 starts charging at the docking station and block the charging status display on the status display unit when the mobile robot is docked even if the charging is completed.

Figure 2:
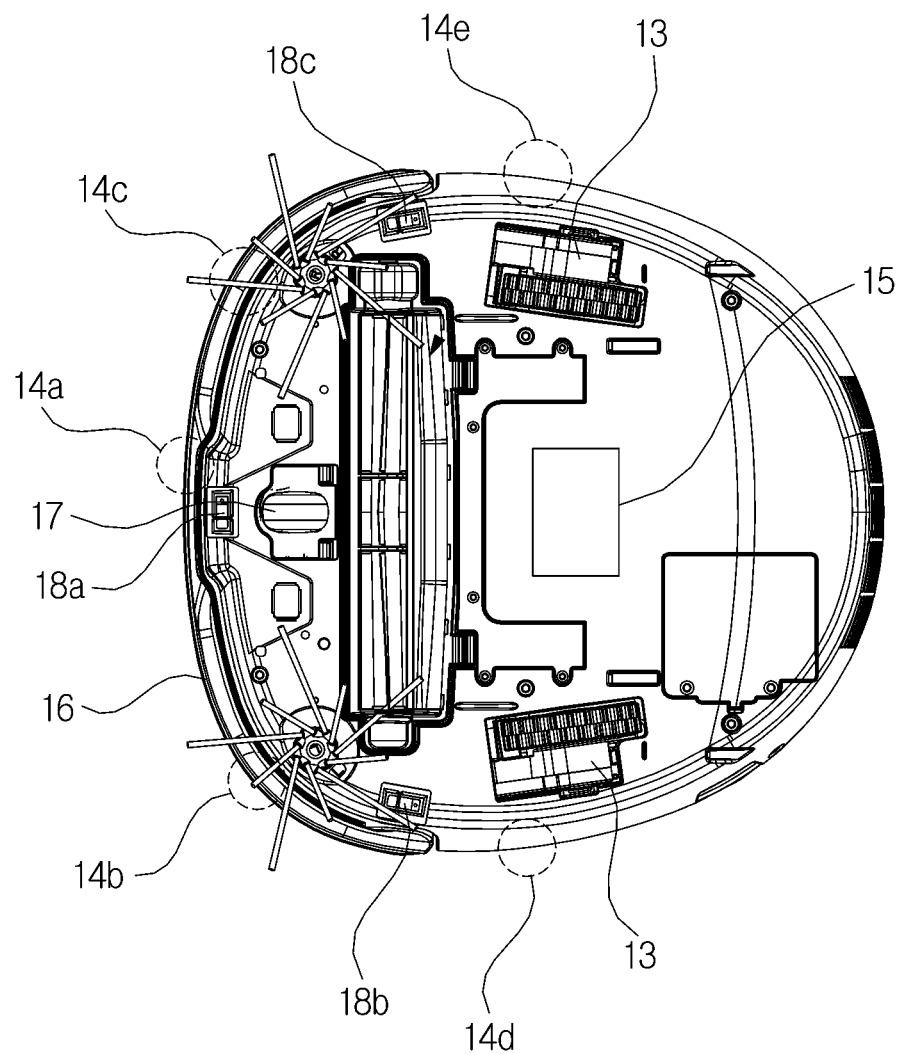
FIG. 2 is a diagram schematically illustrating the autonomously traveling mobile robot according to the embodiment of the present invention.

FIG. 2 is a diagram schematically illustrating the autonomously traveling mobile robot according to the embodiment of the present invention.

Referring to FIG. 2, the autonomously traveling mobile robot according to the embodiment of the present invention includes a first wheel assembly 13, a front sensor unit 14, a signal processing unit 15, a housing 16, and a second wheel 17, and a floor sensor unit 18, and each module may be implemented independently to be detachable or may be implemented in a combined form.

In particular, a main brush assembly, a wheel assembly, and a suction part may be provided to rotate as a set separate from the housing. In this case, a pose, and an actual traveling direction of the autonomously driving mobile robot, and a cleaning direction of the cleaning robot may be different. For example, in the case of a long rectangular space, the pose of the cleaning robot may be toward a wall, and the traveling direction and the cleaning direction may be formed in a longitudinal direction of the space.

The suction part is mounted on the bottom of the housing and sucks foreign substances according to the rotation of the main brush assembly while rising or falling according to the surface condition of the floor.

A plurality of first wheel assemblies 13 and second wheels 17 are provided for traveling of the mobile robot.

The second wheel 17 is mounted on a front area of the bottom of the housing, and the side first wheel assembly 13 is mounted on a central area of the bottom of the housing to receive power from a motor.

In addition, a side brush may be mounted on the bottom of the housing and may be rotatable. The side brush may move foreign substances such as dust on the surrounding floor to the center of the housing, and clean dust accumulated in the corner, that is, the boundaries between the floor and the wall.

The signal processing unit 15 is configured to process an operation related to the traveling area and a user command, and to process a traveling control signal.

The front sensor unit 14 is located in each area 14a, 14b, 14c, 14d, and 14e on an outer peripheral surface of the mobile robot and may detect obstacles around the mobile robot in the areas where the sensors are located. In the embodiment of the present invention, it is preferable to use an infrared distance sensor (PSD sensor). In addition, it is possible to detect obstacles by a method capable of detecting an object.

The floor sensor unit 18 is in each area 18a, 18b, and 18c at a lower end of the mobile robot. The floor sensor unit may recognize missing of wheels of the lower end of the mobile robot, a stair, or a cliff. The floor sensor unit is preferably implemented as an infrared distance sensor (PSD sensor).

The mobile robot uses a plurality of detection sensors to determine distances to various obstacles installed in the cleaning area, for example, obstacles such as furniture and walls, and uses the determined information to clean the cleaning area while traveling so as not to collide with the obstacles.

Figure 3:
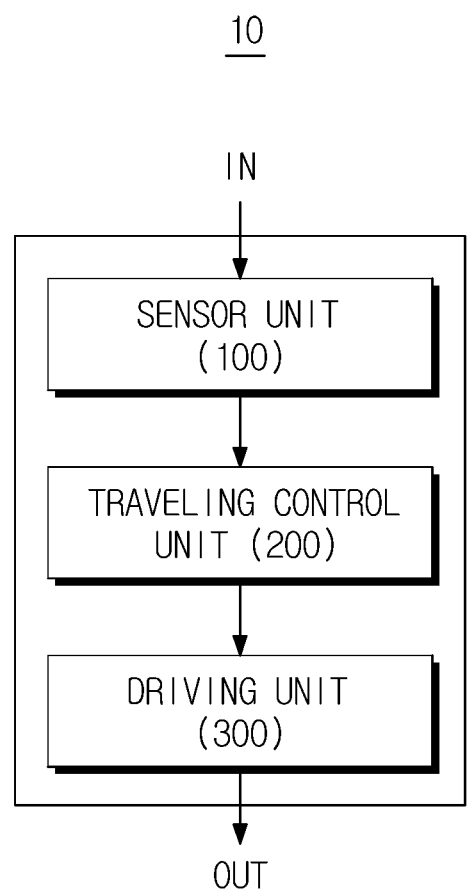
FIG. 3 is a block diagram illustrating a traveling control apparatus of the autonomously traveling mobile robot according to the embodiment of the present invention.

FIG. 3 is a block diagram illustrating a traveling control apparatus of the autonomously traveling mobile robot according to the embodiment of the present invention.

Referring to FIG. 3, the traveling control apparatus 10 of the autonomously traveling mobile robot according to the embodiment of the present invention includes a sensor unit 100, a traveling control unit 200, and a driving unit 300.

The traveling control apparatus 10 of the autonomously traveling mobile robot is a device that generates a traveling mode and controls traveling in order to make the autonomously traveling mobile robot travel along obstacles and a previous trajectory area.

The traveling control apparatus 10 of the autonomously traveling mobile robot according to the embodiment of the present invention is implemented so that the autonomously traveling mobile robot travels a cleaning area in a spiral pattern.

The sensor unit 100 detects obstacles located around the mobile robot. Specifically, when traveling the traveling area, the autonomously traveling mobile robot recognizes an area existing within a predetermined range from the autonomously traveling mobile robot as a surrounding area, divides the recognized surrounding area into a plurality of divided areas according to a location, detects the obstacles in each divided area, and measures a vertical distance from the outer peripheral surface of the mobile robot to an outer peripheral surface of the detected obstacle, respectively.

The traveling control unit 200 controls the traveling of the mobile robot according to a first traveling mode in which the mobile robot follows obstacles located around the mobile robot or a second traveling mode in which the mobile robot travels in consideration of a positional relation with an existing traveling trajectory through which the mobile robot has already traveled, and generates candidate spots where the mobile robot may travel while the mobile robot travels along the traveling trajectory.

The driving unit 300 drives the mobile robot according to a traveling command of the traveling control unit.

Figure 4:
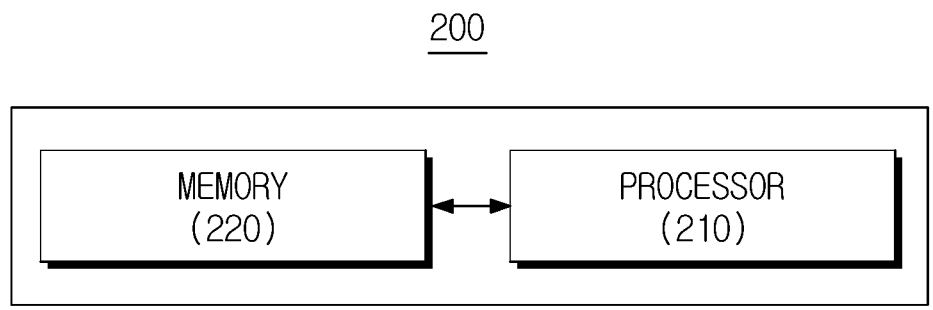
FIG. 4 is a block diagram illustrating a traveling control unit of the autonomously traveling mobile robot according to the embodiment of the present invention.

FIG. 4 is a block diagram illustrating a traveling control unit of the autonomously traveling mobile robot according to the embodiment of the present invention.

Referring to FIG. 4, the traveling control unit according to the present embodiment controls the traveling of the autonomously traveling mobile robot. The traveling control unit refers to a computing device including a microcomputer or a processing device. The traveling control unit includes a memory 220 and a processor 210. The memory stores one or more instructions related to an operation of the mobile robot. The processor 210 performs an operation or processing according to the instructions of the memory 220. Specifically, the memory 220 may store information on software for implementing an algorithm for traveling control, and the processor 210 may generate a control signal for controlling traveling according to an execution of the software and the acquired sensor value, and then transmit the generated control signal to a driving module (for example, driving motor). According to the present embodiment, the processor is used interchangeably with the traveling control process.

Figure 5:
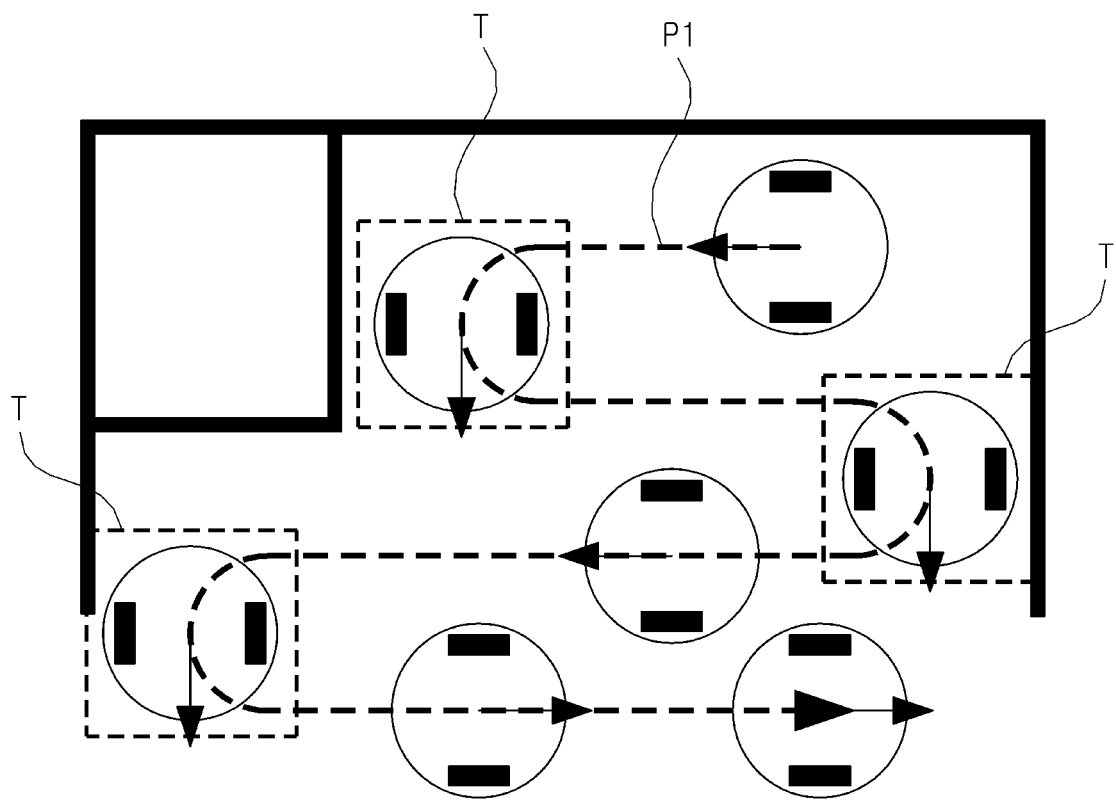
FIGS. 5 and 6 are diagrams for describing a cleaning pattern of the autonomously traveling mobile robot according to the embodiment of the present invention.
Figure 6:
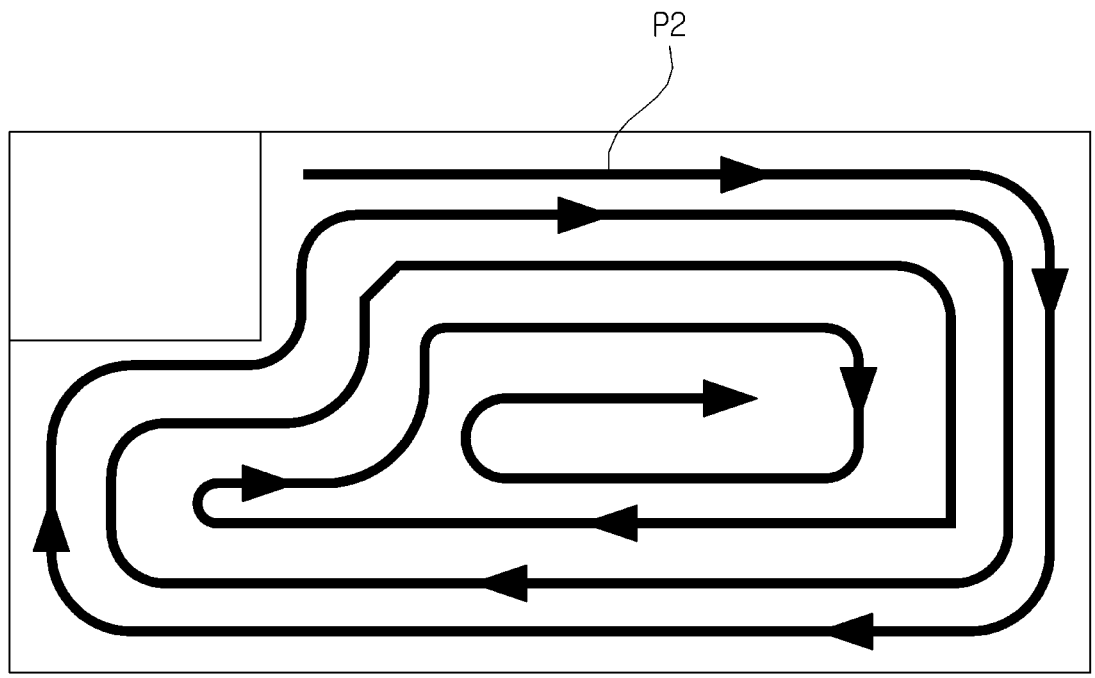

FIGS. 5 and 6 are diagrams for describing a cleaning pattern of the autonomously traveling mobile robot according to the embodiment of the present invention.

FIG. 5 illustrates a zigzag cleaning pattern P1 of the existing autonomously traveling mobile robot. As illustrated in FIG. 5, the cleaning pattern of the existing zigzag movement method gives a lot of loads to the movement of the robot and generates a lot of 180° turn (T) that consumes a lot of time.

In addition, the zigzag pattern includes a lot of abrupt motions that require a 180° change of direction, so the load on the movement of the robot is large and the time consumption is large while traveling.

FIG. 6 illustrates a spiral cleaning pattern of the autonomously traveling mobile robot according to the embodiment of the present invention.

When a spiral cleaning pattern P2 is applied to the autonomously traveling mobile robot, the cleaning form as illustrated in FIG. 5 appears, and when the spiral cleaning pattern is applied to the cleaning robot as illustrated in FIG. 6, it may be seen that the 180° turn that puts a load on the robot is remarkably reduced.

In this way, when the spiral cleaning pattern is applied to the cleaning robot, the cleaning time of the robot may be reduced, and the energy efficiency may be increased as the cleaning time is reduced.

Figure 7:
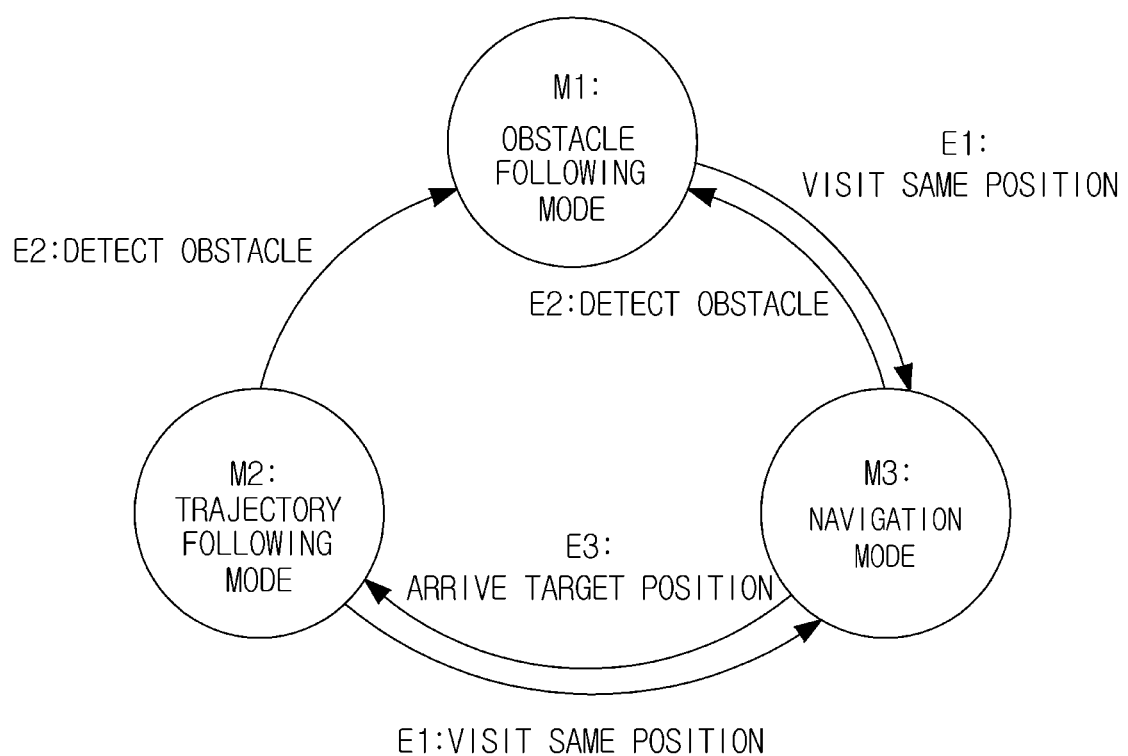
FIG. 7 is a diagram for describing a traveling mode and an event of the autonomously traveling mobile robot according to the embodiment of the present invention.

FIG. 7 is a diagram for describing a traveling mode and an event of the autonomously traveling mobile robot according to the embodiment of the present invention.

FIG. 7 illustrates a configuration of the spiral cleaning pattern of the autonomously traveling mobile robot according to the embodiment of the present invention.

As illustrated in FIG. 7, the spiral cleaning pattern is mainly composed of three modes and three events.

A first traveling mode M1 is an obstacle following mode and is a mode in which the cleaning robot travels while maintaining a predetermined distance between an obstacle and a side of the cleaning robot.

A second traveling mode M2 is a trajectory following mode. The meaning of the following trajectory does not mean traveling along the same trajectory as the existing trajectory but means traveling along the existing trajectory but traveling spaced apart by a predetermined distance. In particular, it is preferable to determine the trajectory so that the traveling control unit travels inward, instead traveling outwardly of the existing trajectory.

The first traveling mode and the second traveling mode may be transitioned to each other when a transition condition is satisfied. For example, in the process of traveling according to the second traveling mode, when obstacles are detected around the mobile robot or when a cliff is detected or an escape operation is required, the traveling control unit may change the current traveling mode to a first traveling mode. In addition, when the mobile robot is no affected by the influence of obstacles, is away from the cliff, or completes its escape, the traveling control unit may again perform a mode transition to the second traveling mode.

A third traveling mode M3 is a navigation mode, and a mode in which the cleaning robot travels along a given target point.

Also, a first event E1 is "visit same position," and is an event that occurs when the cleaning robot revisits a previously visited position.

A second event E2 is "detect obstacles," and is an event that occurs when obstacles are detected around the cleaning robot.

A third event E3 is "arrive target position," and is an event that occurs when the cleaning robot arrives at the target position when the cleaning robot travels toward the target position.

Figure 8:
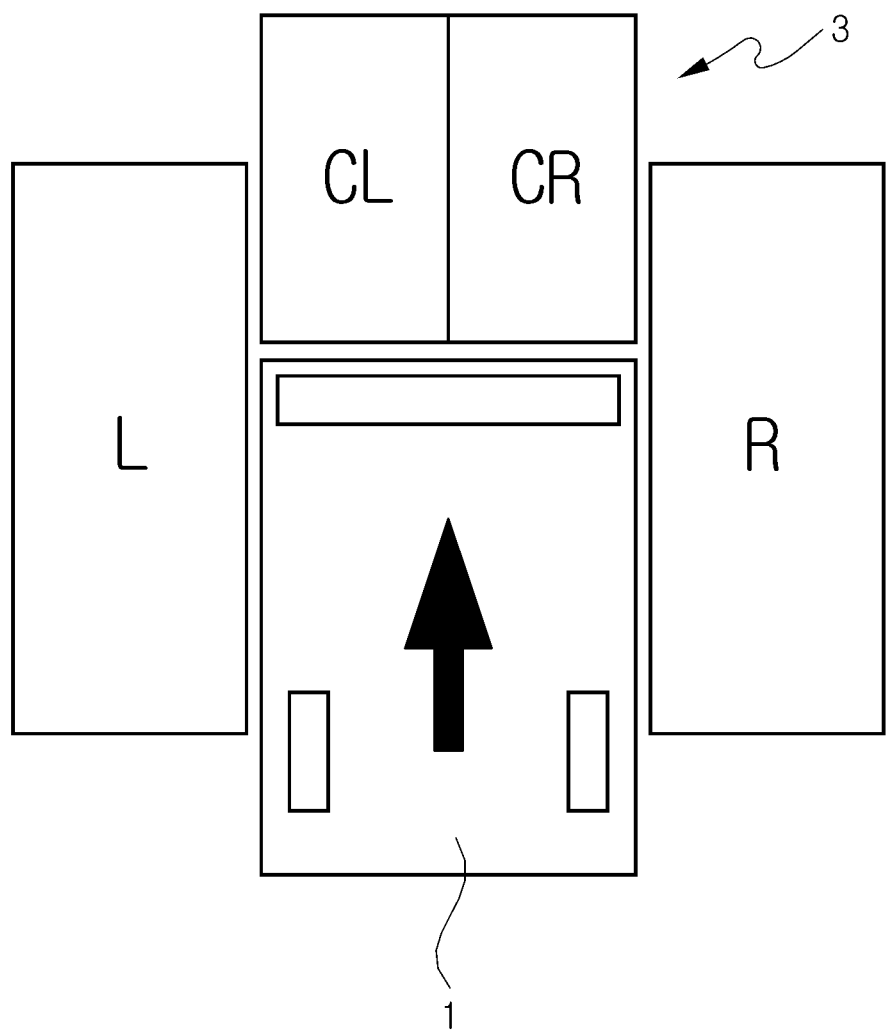
FIG. 8 is a diagram for describing a divided area of the autonomously traveling mobile robot according to the embodiment of the present invention.

FIG. 8 is a diagram for describing a divided area of the autonomously traveling mobile robot according to the embodiment of the present invention.

FIG. 8 illustrates an obstacle/previous trajectory detection area for maintaining the spiral cleaning pattern of the autonomously traveling mobile robot according to the embodiment of the present invention.

As illustrated in FIG. 8, the autonomously traveling mobile robot uses an area 3, which is divided into 4, in order to travel along an obstacle and a previous trajectory area.

The divided area 3 is an area in which the surrounding area is divided into a right area which is an area located on the right based on the autonomously traveling mobile robot, a left area which is an area located on the left, and a center area which is an area located in the front.

Each mode and event described in FIG. 7 will be described using the divided area illustrated in FIG. 8.

In the obstacle following mode, which is the first traveling mode M1, when obstacles are not detected in any area, the mobile robot travels at a basic movement speed and a basic rotation speed in a counterclockwise (CCW) direction.

When obstacles are detected at a distance closer than a preset distance from the front of the mobile robot, the mobile robot is controlled to rotate in a direction in which the speed of the mobile robot is reduced and a radius of curvature of the mobile robot is smaller.

The direction of rotation may vary depending on a direction in which the spiral pattern to be implemented is wound. For example, when obstacles are detected in an area CL or an area CR, the mobile robot rotates in a clockwise (CW) direction until obstacles are detected in an area L.

On the other hand, when obstacles are detected in an area R, the mobile robot rotates in the CW direction until obstacles are detected in area L.

When obstacles are detected in an area L, the cleaning robot advances while a minimum distance between the obstacles detected in the area L and the cleaning robot is maintained at the user's desired distance.

A priority of the detection areas is R>CL and CR>L.

When controlling the traveling trajectory of the mobile robot according to the second traveling mode, the traveling of the mobile robot is controlled so that the trajectory according to the first traveling mode in which the mobile robot has already traveled and an overlap according to a predetermined criterion are generated. The second traveling mode is a traveling mode related to a point that the mobile robot has already visited and is a mode (trajectory following mode) in which the mobile robot follows a trajectory related to the point.

Here, the overlap according to the predetermined criterion refers to, for example, the traveling of the cleaning robot while maintaining the minimum overlap with a wall trajectory through which the cleaning robot has already traveled when the cleaning robot travels along a wall trajectory of a cleaning area according to the first traveling mode. Here, the minimum overlap is not limited to continuous overlap. For example, when the mobile robot is a cleaning robot, if a working width (a width of a main brush or a suction part) of the cleaning robot is W, an overlapping width S is preferably ¼ W≤S≤¾ W but is not limited to the range. This is because, when the overlapping area is too large, cleaning efficiency decreases, and when there is no overlap, an uncleaned area may occur. However, in the case of an area requiring intensive cleaning, the overlapping area may be required to be wider. The overlapping area may be adjusted based on a signal from a dust sensor mounted on the mobile robot or an image processing device capable of processing an image for dust sensing.

For example, in the trajectory following mode, which is the second traveling mode M2, if there is a trajectory through which the mobile robot has already traveled in the CL and CR, the mobile robot rotates in the CW direction.

When the trajectory through which the mobile robot has already traveled is detected in the L, the robot advances while maintaining a predetermined distance. A priority of the detection areas is CL and CR>L.

The navigation mode which is the third traveling mode M3 is a mode in which the cleaning robot travels to candidate spots to be visited when the cleaning robot repeatedly visits the point that the cleaning robot has already visited.

Specifically, when the current location of the mobile robot is included in the existing trajectory that the mobile robot has already traveled, or when the obstacle being followed is not detected, a traveling control processor controls the traveling of the mobile robot according to the third traveling mode that determines the traveling trajectory of the mobile robot in consideration of the generated candidate spot.

Here, the case where the obstacle being followed is not detected does not mean the case where the discontinuity appears temporarily when the mobile robot travels along the obstacle but means the case where the discontinuity is detected exceeding a predetermined criterion or the obstacle is not actually located in the surrounding area.

In the navigation mode, the closest candidate spot among the candidate spots is set as a target point.

The movement trajectory from the current position of the robot to the candidate spot is generated, and thus, the mobile robot avoids collision with obstacles while moving along the movement trajectory.

Figure 9:
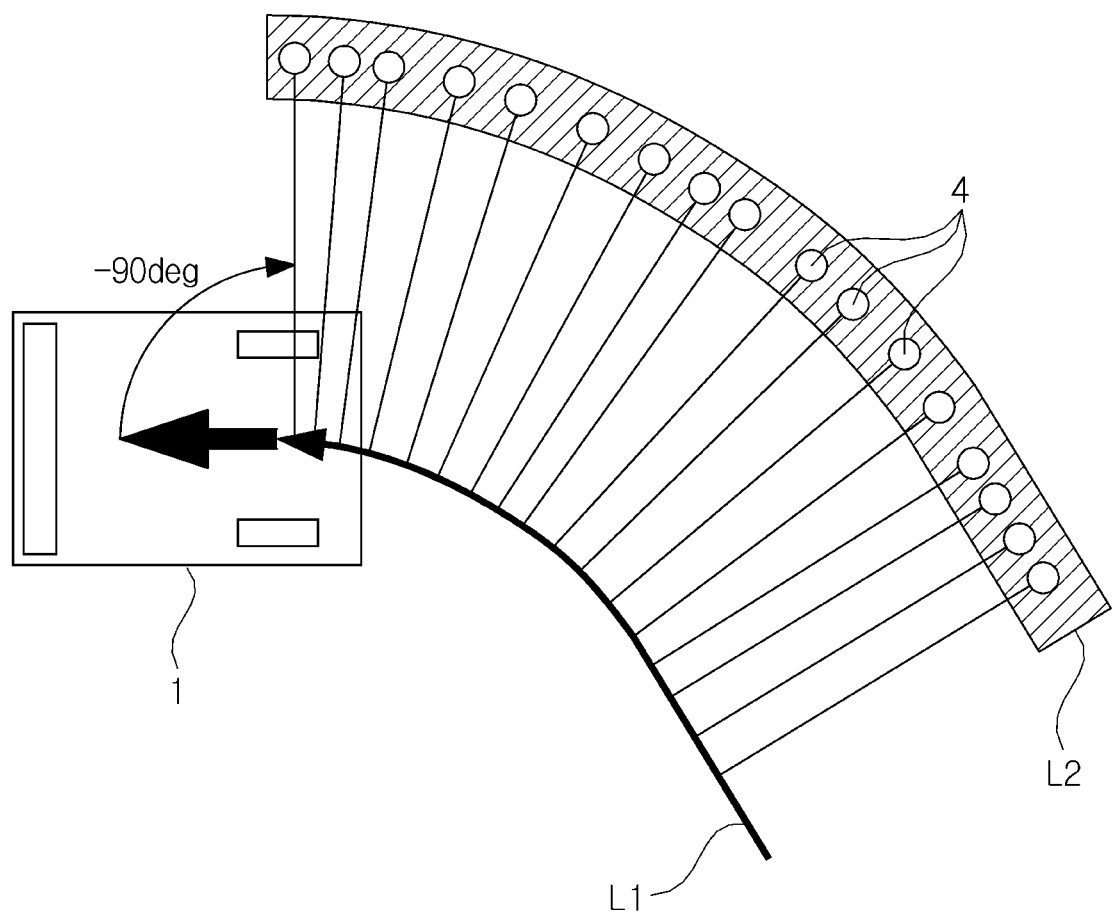
FIG. 9 is a diagram for describing a generation of candidate spots of the autonomously traveling mobile robot according to the embodiment of the present invention.

FIG. 9 is a diagram for describing a generation of candidate spots of the autonomously traveling mobile robot according to the embodiment of the present invention.

Referring to FIG. 9, when the traveling mode is the first traveling mode (obstacle following mode) or the second traveling mode (trajectory following mode), the traveling control processor generates candidate spots as illustrated in FIG. 8.

A number of candidate spots (4) are generated in the area L2 located in a direction perpendicular to a movement trajectory L1 of the autonomously traveling mobile robot 1, and when there are candidate spots on the trajectory through which the autonomously traveling mobile robot travels, the candidate spots are deleted. Here, the candidate spots are generated in a −90° direction of the robot.

That is, the traveling control processor generates each point where the mobile robot is located in an expected movement trajectory L2 of the autonomously traveling mobile robot as a travelable candidate spot and deletes the travelable candidate spot when the travelable candidate spot is an area where there is an obstacle or when the travelable candidate spot exists in the trajectory through which the mobile robot has already traveled.

Figure 10:
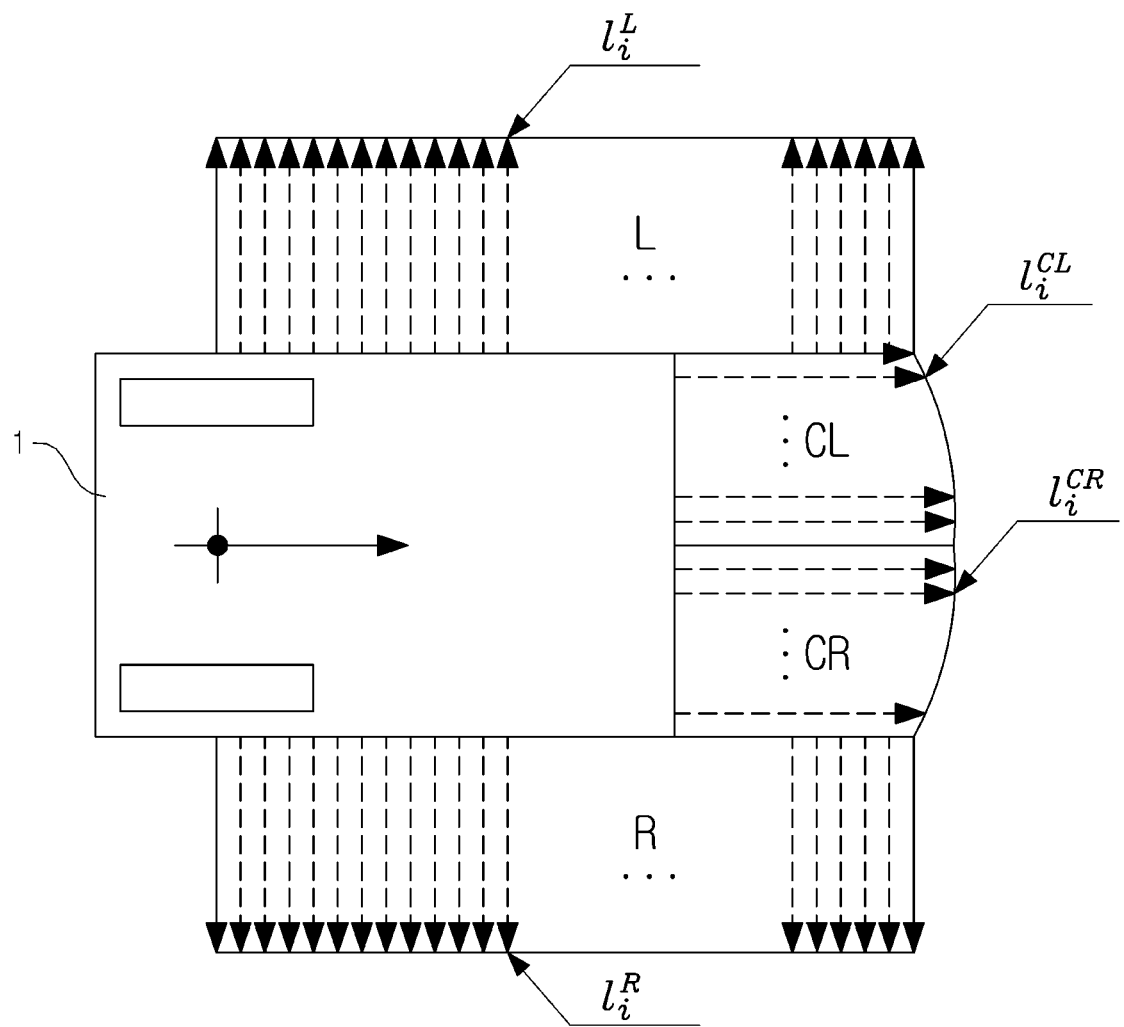
FIGS. 10 and 11 are diagrams for describing a detection of an obstacle of the autonomously traveling mobile robot according to the embodiment of the present invention.
Figure 11:
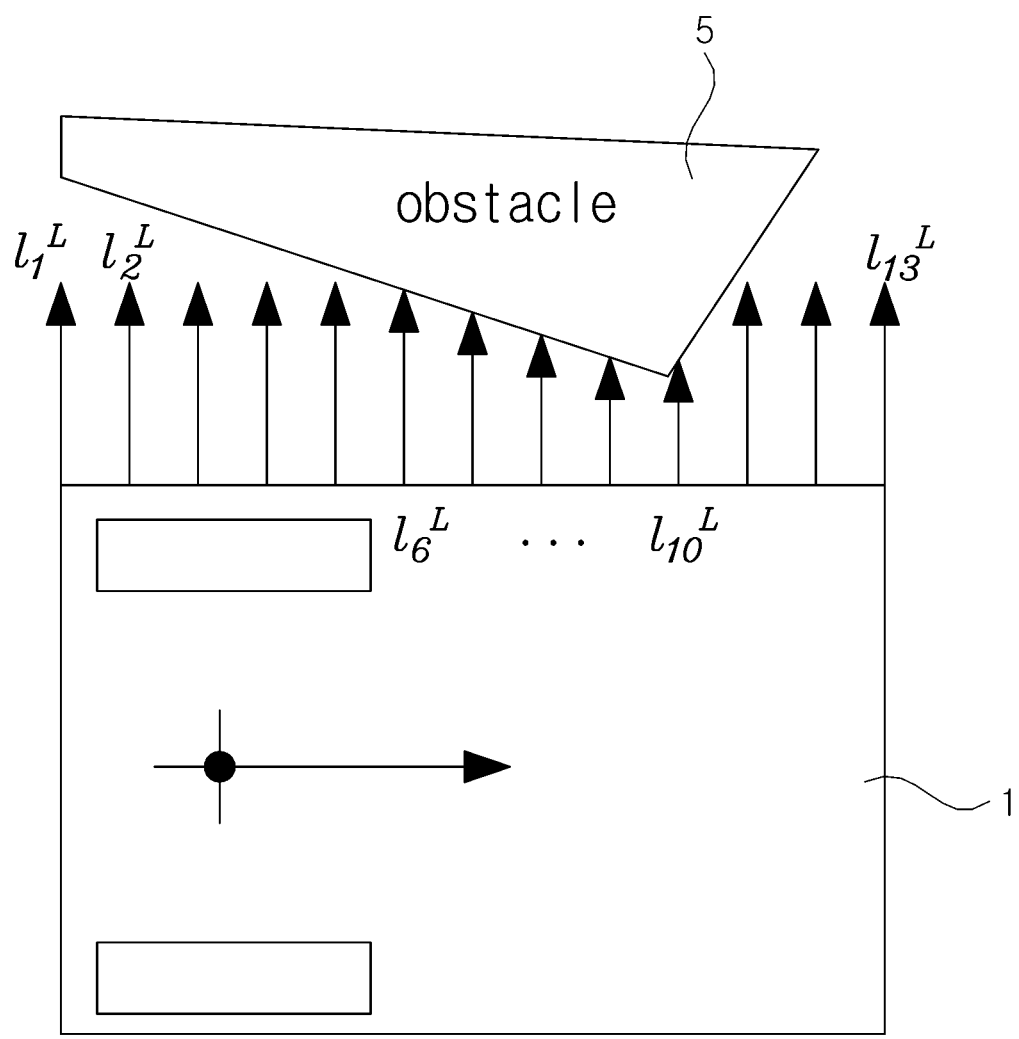

FIGS. 10 and 11 are diagrams for describing a detection of an obstacle of the autonomously traveling mobile robot according to the embodiment of the present invention.

The sensor unit 100 detects obstacles in the divided area and measures vertical distances to outer peripheral surfaces of obstacles detected based on the outer peripheral surface of the autonomously traveling mobile robot, respectively. When traveling along the traveling area, obstacles may be detected by a separate sensor unit.

As illustrated in FIG. 10, the autonomously traveling mobile robot is capable of detecting obstacles in four areas. The detected obstacle having a surrounding area may be denoted by a distance of $l_i^x$, in which the surrounding area has four obstacle detection areas of the left area (L), the center left area (CL), the center right area (CR), and the right area (R) among areas divided into a right area as an area located at the right, a left area as an area located at the left, and a center area as an area located at the front, based on the autonomously traveling mobile robot.

Specifically, the distance to the obstacle is a length measured vertically from the outer peripheral surface of the autonomously traveling mobile robot to the closest part of the outer peripheral surface of the obstacle.

For example, the left area L may be denoted by $l_i^L$ the right area R may be denoted by $l_i^R$, the center left area CL may be denoted by $l_i^{CL}$, and the center right area CR may be denoted by $l_i^{CR}$.

FIG. 11 illustrates an example where obstacles are detected within the left area L.

As illustrated in FIG. 11, a measure indicating when an obstacle 5 is detected within the left area (L) of the autonomously traveling mobile robot 1 is denoted by $l_i^L$ (i=1, ... , n). In this way, even in the L, CL, CR, and R areas, positions of obstacle on an i-th line may be denoted by $l_i^L$, $l_i^{CL}$, $l_i^{CR}$, and $l_i^R$, respectively. In this case, the R area is mainly used when the mobile robot travels along the side obstacle or based on the previous cleaning pattern, and the CL, CR, and L areas are used to avoid collision with the obstacle.

In addition, the distance to the obstacle 5 is measured by designating each point of the autonomously traveling mobile robot with a line. For example, each distance to $l_1^L, l_2^L, l_3^L,$ ..., $l_{11}^L, l_{12}^L, l_{13}^L$ is measured based on the outermost part of the autonomously traveling mobile robot, which is to solve an error occurring when measuring only one point because the distance to the autonomously traveling mobile robot is not constant in all points when an obstacle includes a curve or an inclined plane.

Here, the autonomously traveling mobile robot travels with the central area as the traveling direction.

Figure 12:
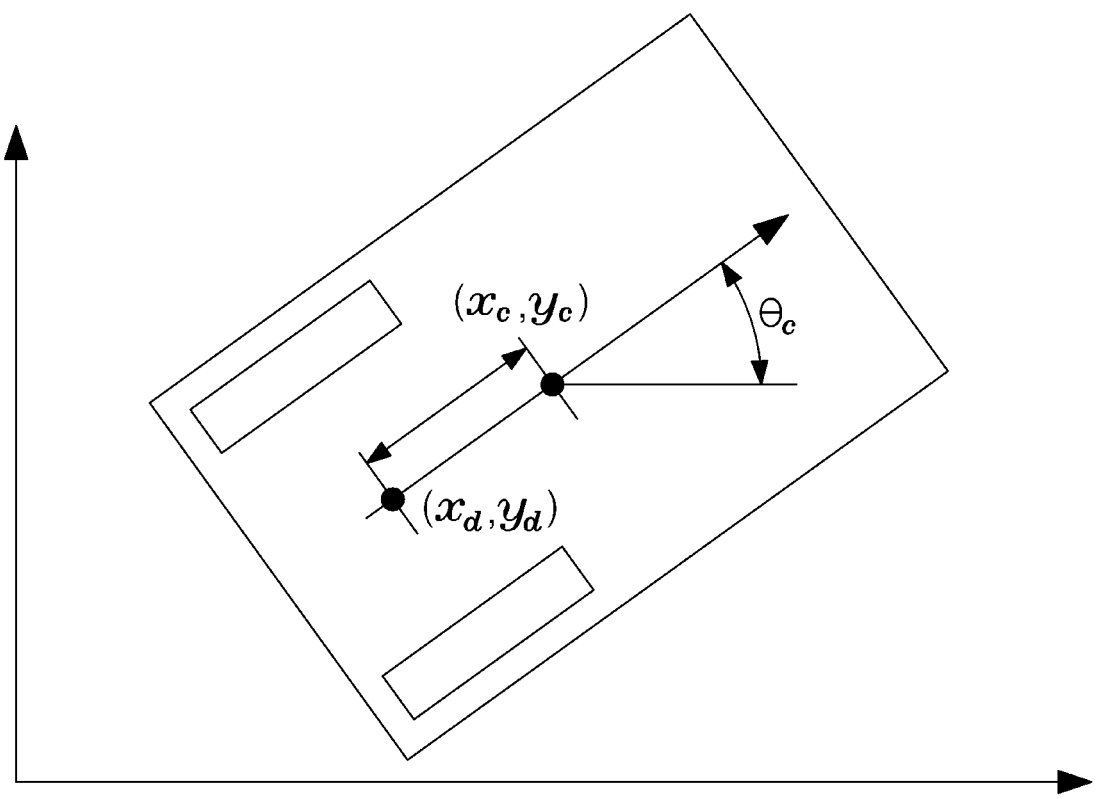
FIG. 12 is a diagram for describing kinematics characteristics of the autonomously traveling mobile robot according to the embodiment of the present invention.

FIG. 12 is a diagram for describing kinematics characteristics of the autonomously traveling mobile robot according to the embodiment of the present invention.

Like the kinematics structure of the robot illustrated in FIG. 12, in the case of an autonomously traveling mobile robot according to the embodiment of the present invention, the center and the drive shaft of the autonomously traveling mobile robot are different, and therefore, the autonomously traveling mobile robot has kinematics characteristics as shown in Equation 1 below.

$$\begin{cases} \dot{x}_d = v\cos(\theta) \\ \dot{y}_d = v\sin(\theta) \\ \dot{\theta}_d = \omega \end{cases}$$ [Equation 1]

Here, $x_d$ and $y_d$ are the positions of the drive shaft, $\theta_d$ is an angle viewed from the drive shaft, and $v$ and $\omega$ are a forward speed and a rotational speed of the robot, respectively.

The relationship with positions $x_c$, $y_c$, and $\theta_c$ between the drive shaft and the central axis of the autonomously traveling mobile robot is implemented by Equation 2 below.

$x_c = x_d + d \cos(\theta_c)$ $y_c = y_d + d \sin(\theta_c)$ $\theta_c = \theta_d = \theta$ [Equation 2]

Through the time differentiation of the above Equation 2, the relationship between the speed and the center positions $x_c$, $y_c$, and $\theta_c$ of the robot may be obtained by Equation 3 below.

$$\begin{cases} \dot{x}_c = v\cos\theta_c - d\sin\theta_c \cdot \omega \\ \dot{y}_c = v\sin\theta_c + d\cos\theta_c \cdot \omega \\ \dot{\theta}_c = \omega \end{cases}$$ [Equation 3]

The movement of the robot is determined when the forward speed and the rotational speed are given by Equation 3 above.

The first traveling mode (obstacle following mode) may be described based on the configuration and movement of the robot described above. First, the robot maintains its posture so that there is a wall on the right. First, for the safety of the robot, when there is an obstacle detected in the front, the robot has the same movement as in Algorithm 1 below in order to avoid the collision with the obstacle and guide the robot to the right.

[Algorithm 1]
Algorithm 1. Collision avoidance with front obstacle if (min (min($l_i^{CL}$), (i=1,.., n) , min($l_i^{CR}$), (i=1, .., n))) < ξ_th
{
    w = w_max;
    v = 0;
}

As shown in Algorithm 1 above, when there is an obstacle in front of the robot, the robot rotates to the left so that the obstacle in front of the robot goes to the right side of the robot. When Algorithm 1 is applied, if an obstacle is detected at a distance closer than ξ_th to the front of the robot traveling forward, the robot stops and rotates, and therefore, the robot may suddenly stop and rattle, which may put a load on the robot or take movements that are inconvenient for a user to see. It is possible to apply the following Algorithm 2 to compensate for this movement.

[Algorithm 2]
Algorithm 2. Avodiance of front obstacle, including natural deceleration w = f(min($l_i^{CL}$), min($l_i^{CR}$))
v = μ( ω ) · v̄ , where v̄ denotes maximum forward speed FIG. 13 is a diagram for describing an algorithm of the autonomously traveling mobile robot according to the embodiment of the present invention.

Figure 13:
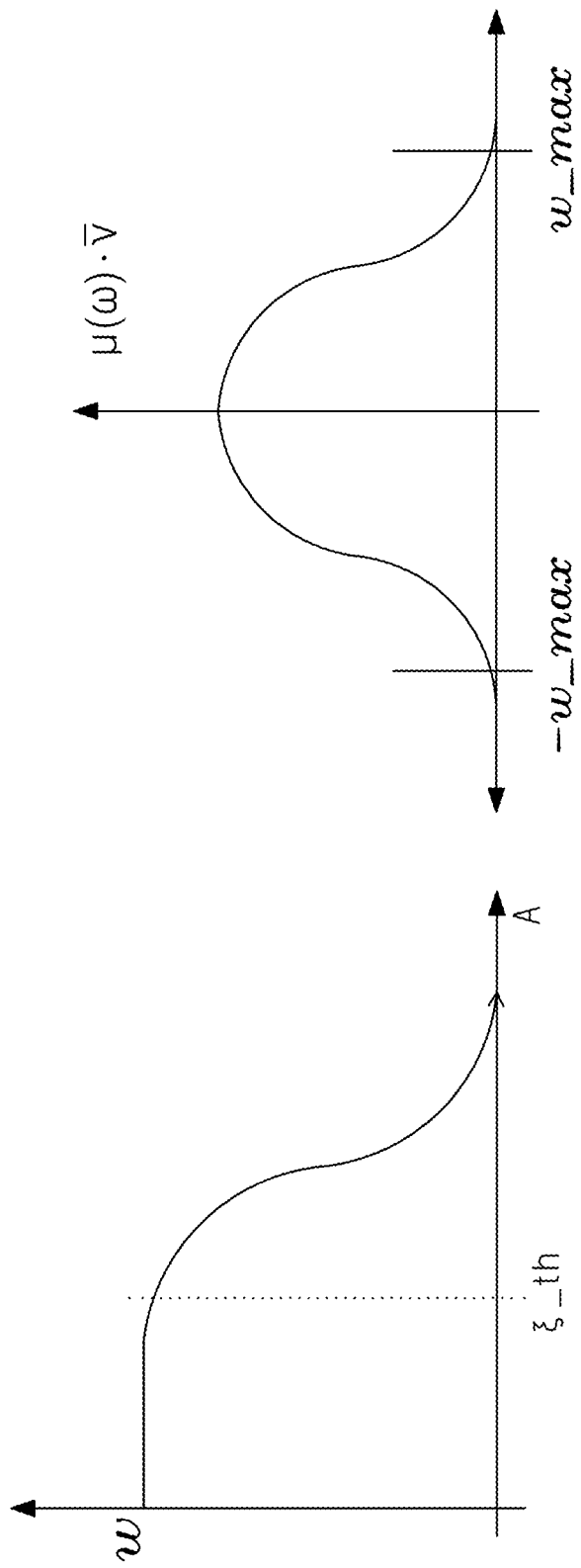
FIG. 13 is a diagram for describing an algorithm of the autonomously traveling mobile robot according to the embodiment of the present invention.

In Algorithm 2, if min(min($l_i^{CL}$), min($l_i^{CR}$))=A, a function of ω and μ(ω)·v̄ may be denoted as illustrated in FIG. 13.

FIG. 13 shows a function of the rotational speed co and the forward speed $\mu(\omega) \cdot \bar{v}$.

As shown in Algorithm 2 above, the forward speed and rotational speed of the robot are determined according to the positions of the obstacles located at the CR and CL, so that the robot may rotate so that the obstacle comes to the right side of the robot while accelerating and decelerating naturally without sudden stops/starts.

A situation similar to the case where there is an obstacle in front of the robot is the case where the obstacle is on the left side of the robot. In this case, the robot needs to rotate 180° in place because the obstacle is at a completely opposite side to the right side where the robot wants the obstacle to be. Therefore, the robot travels according to the following Algorithm 3.

[Algorithm 3]
Algorithm 3. Avodiance of obstacle located on left if( min($l_i^L$, i=1,..., n) < ξ_L )
{
 v = 0;
 w = w_max;
}

After the obstacle is positioned on the right side of the robot according to Algorithms 1 to 3, the robot may travel along the obstacle on the right. The robot travels along the surface of the obstacle while maintaining a predetermined distance from the obstacle. To this end, the robot is controlled by Algorithm 4 so that the distance from the obstacle located in the R area may be maintained at the desired reference distance.

[Algorithm 4]
Algorithm 4

$e_l = ( 1_{des} - \min( 1_i^R, i = 1, ..., n) )$
$\omega = \omega_{max} \tanh(k \cdot e_l)$ Here, k>0 is a constant, and the forward speed is a constant or varies according to ω as in Algorithm 2.

According to Algorithm 4, when the obstacle is in the R area, the robot may travel while maintaining a predetermined distance $l_{des}$ from the obstacle. If there are no obstacles in the L, R, CL, and CR areas, the robot travels as in Algorithm 5 below to find the obstacle.

[Algorithm 5]
Algorithm 5

$v = v_{min}$
$\omega = \dfrac{v}{\left(l_{des} + \dfrac{\alpha}{2}\right)}$

Here, $v_{min}$ is a minimum traveling forward speed which is a constant, and α is a distance between wheels.

Figure 14:
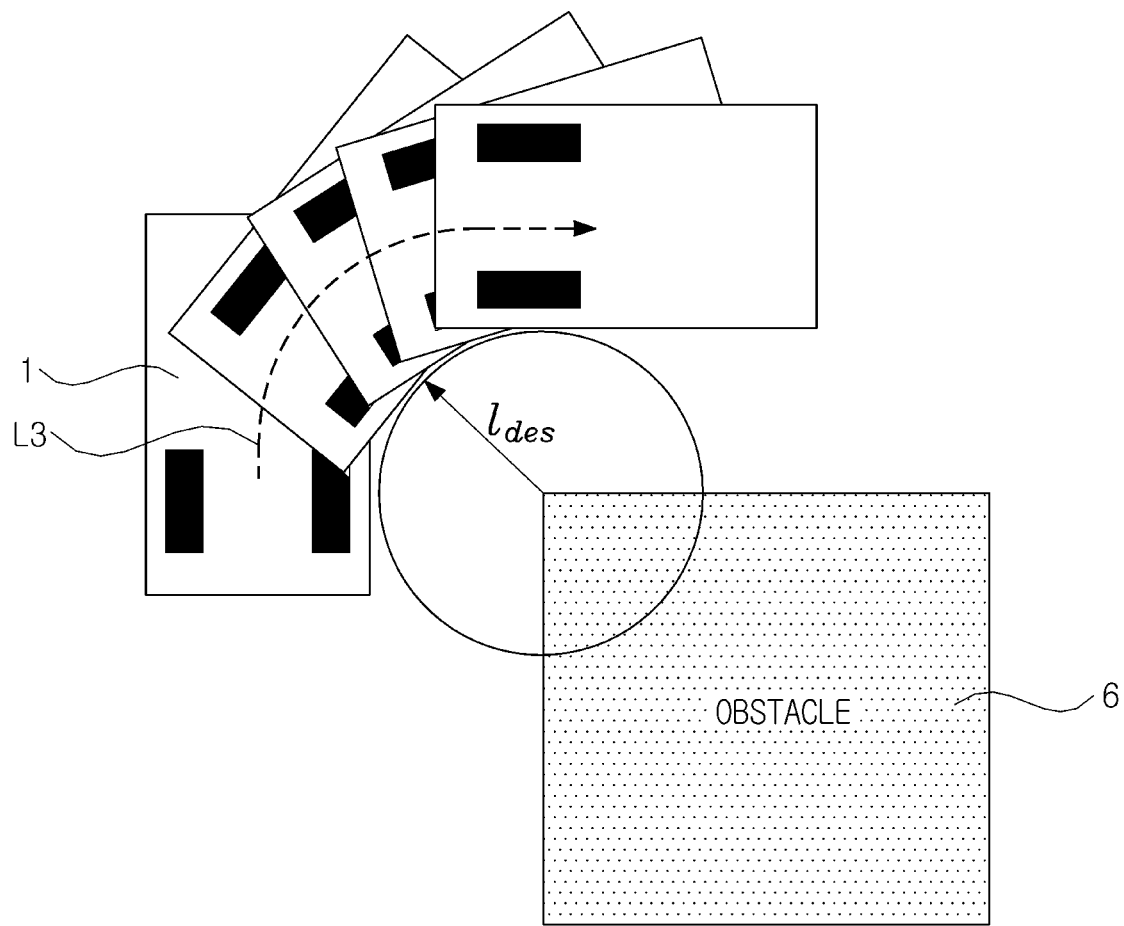
FIGS. 14 and 17 are diagrams for describing a motion of the autonomously traveling mobile robot according to the embodiment of the present invention.
Figure 17:
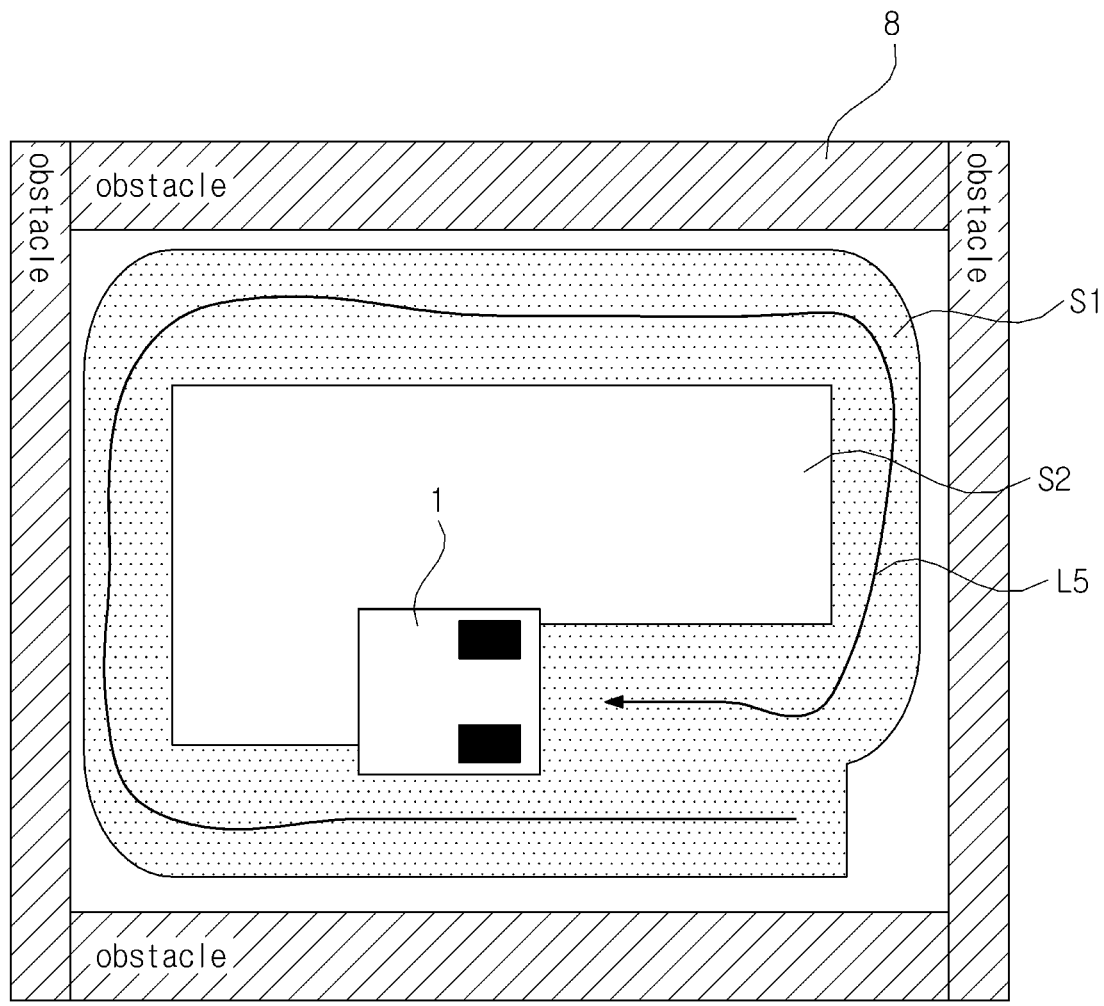

FIGS. 14 and 17 are diagrams for describing a motion of the traveling control apparatus of the autonomously traveling mobile robot according to the embodiment of the present invention.

According to the above Algorithm 5, the autonomously traveling mobile robot travels as illustrated in FIG. 14.

As illustrated in FIG. 14, the autonomously traveling mobile robot 1 rotates while maintaining $l_{des}$ from obstacle 6 and finds an obstacle in the right area. In this case, the trajectory is L3.

In the step of controlling the traveling of the mobile robot according to the first traveling mode, when the discontinuity occurs in the detection of the obstacle that the mobile robot follows, the mobile robot is controlled to travel in consideration of the distance between the obstacle being followed and the mobile robot and the distance between the two wheels of the mobile robot.

Here, the discontinuity in the detection of the occurring obstacle occurs when the obstacle is temporarily located at the edge, corner, or curved surface of the obstacle, and does not occur due to the absence of the obstacle in the surrounding area but occur temporarily. Therefore, the robot travels along the side surface of the obstacle according to the detection of the sensor unit.

Figure 15:
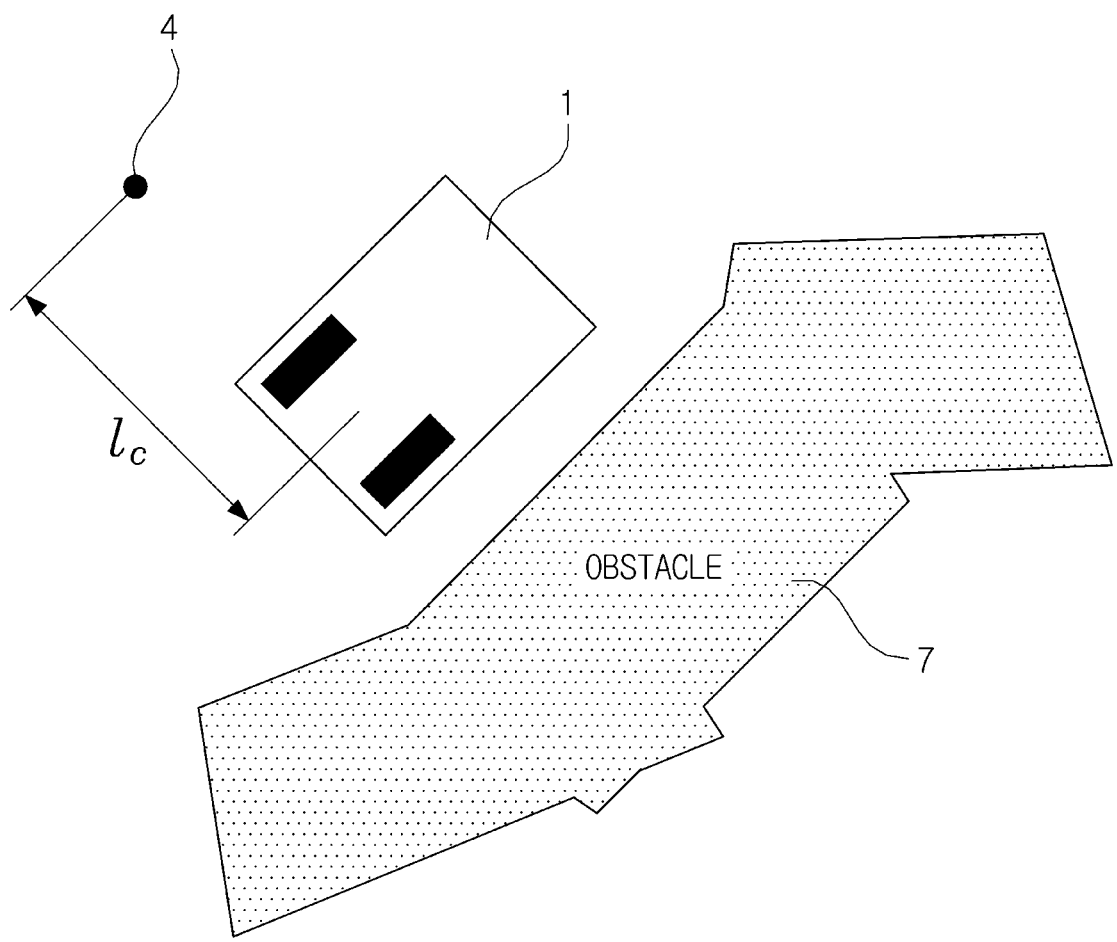

Referring to FIG. 15, while the autonomously traveling mobile robot 1 travels along the obstacle while avoiding collision with an obstacle 7 through the above Algorithms 1 to 5, the robot generates and stores the information on the points to which the robot may travel next. This is called the travelable candidate spot 4.

The candidate spots are selected using wheel encoder information according to a rotation of a main wheel for traveling the mobile robot and a distance between a center of the mobile robot and the main wheel.

Here, the wheel encoder counts a rotation of a pair of main wheels, and the counted rotation value may be used to estimate the traveling trajectory and the position of the mobile robot. That is, the movement trajectory of the wheel or the position of the wheel in space may be calculated. The wheel encoder information includes coordinates and center coordinates of the main wheel.

The travelable candidate spots generated as illustrated in FIG. 15 are continuously accumulated as the autonomously traveling mobile robot continues to travel, and the candidate spots are generated through the same process as in the following Algorithm 6.

[Algorithm 6]
Algorithm 6

$P_c = \{(x_c^i, y_c^i) | \text{candidate spot}\}$
$x_c^i = x_d + l_c \cos\left(\theta_r + \dfrac{\pi}{2}\right),$
$y_c^i = y_d + l_c \sin\left(\theta_r + \dfrac{\pi}{2}\right)$ Here, when $P_c$ overlaps an obstacle or is a point where the robot has already traveled, $P_c$ is deleted from the candidate spot.

Also, if the robot is traveling along an obstacle, the trajectory through which the robot travels is stored in the form of a map. Therefore, the robot travels along the surface of the obstacle, and then travels at a predetermined distance from the trajectory through which the robot has already traveled, so the robot may gradually cover more area based on the previous trajectory, which will be performed in the second traveling mode.

Figure 16:
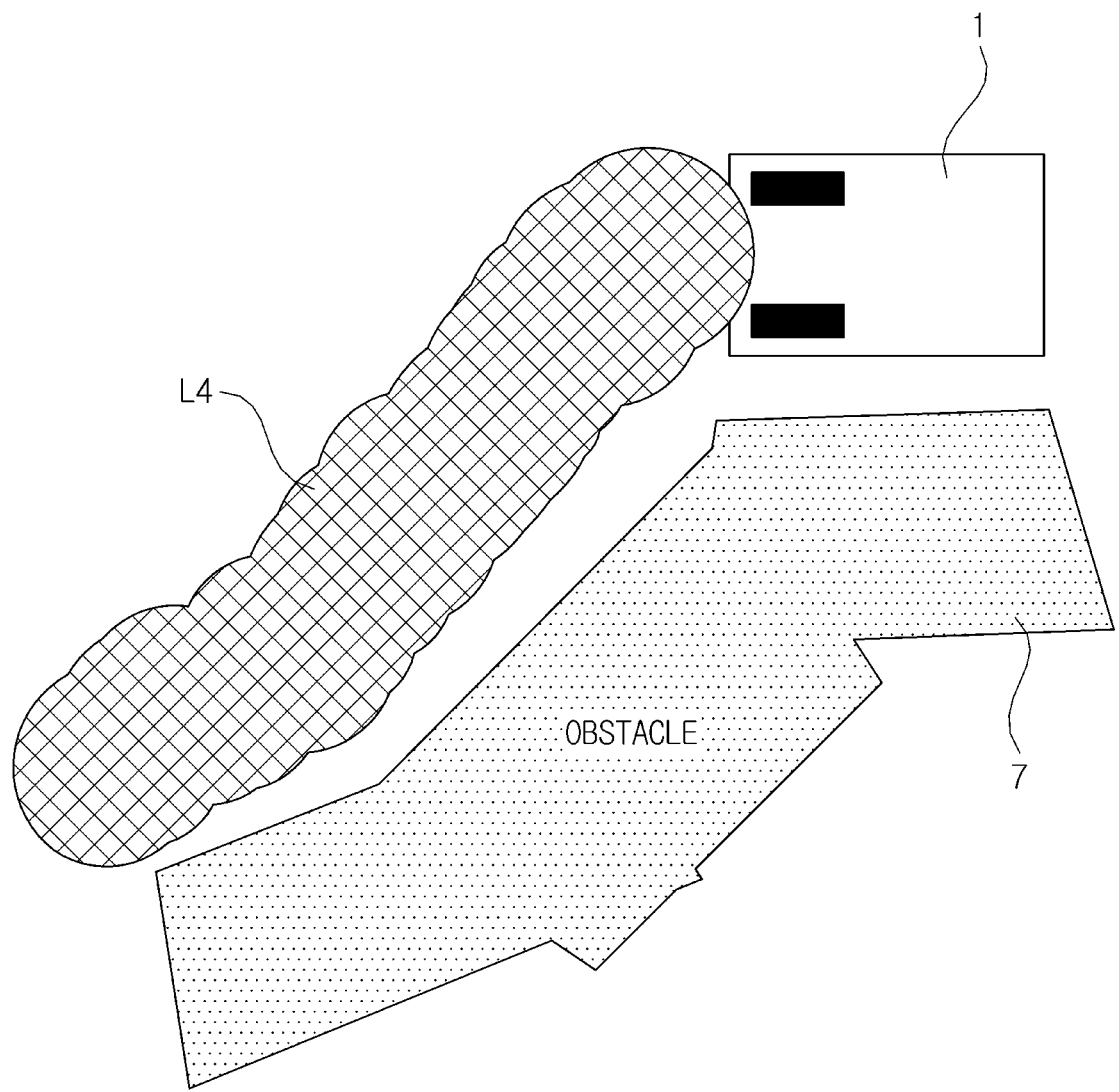

FIG. 16 illustrates the movement trajectory of the autonomously traveling mobile robot displayed on the map.

The navigation mode which is the third traveling mode M3 is a traveling mode for cleaning by avoiding the previous trajectory. When the robot repeatedly travels to the point where the robot has already traveled, the robot is highly likely to clean the overlapping area, which leads to the decrease in efficiency. Accordingly, it is preferable that the robot travels to a point where the robot did not travel.

Therefore, when the robot is repeatedly positioned at the previous point, the robot travels by selecting the most suitable point among the travelable candidate spots.

In the second traveling mode (trajectory following mode), the robot that travels to the closest candidate spot through the third traveling mode (navigation mode) finds the trajectory through which the mobile robot has traveled. The method of finding the trajectory is very similar to Algorithm 5 above for finding the obstacle. First, the robot checks its location on the map, checks whether the previously traveling trajectories in L, CL, CR, and R, which are its detection areas, are marked on the map. The robot finds the previous trajectory through Algorithm 7 when there is no trajectory through which the robot has already traveled within the detection area.

[Algorithm 7]
Algorithm 7

$v=0$, $\omega=-\omega_{max}$

Here, if the previously traveling trajectory is detected in the R on the map, $v=0$, $\omega=0$.

By the above Algorithm 7, the robot may find the previously traveling trajectory while rotating in place after traveling to the closest candidate spot. Thereafter, it is possible for the robot to travel with the trajectory through which the robot has already traveled being on the right. It is possible for the mobile robot to travel along the trajectory based on Algorithm 8 in a manner similar to Algorithm 4 above.

[Algorithm 8]
Algorithm 8

$e_l^T = l_{des} - \min(l_i^R, i = 1, ..., n)$
$\omega = \omega_{max} - \tanh(k \cdot e_l^T)$ Here, $l_i^R$ is the distance from the previous movement trajectory detected in the R area.

When the autonomously traveling mobile robot travels as in Algorithm 8, the trajectory pattern may move as illustrated in FIG. 17.

FIG. 17 is a trajectory through which the robot travels by Algorithm 4 and Algorithm 8. The autonomously traveling mobile robot 1 gradually travels inward while avoiding the obstacle 8, and travels while maintaining a predetermined distance from the previous traveling trajectory L5 inside the previous trajectory S1 so that it does not overlap the previous traveling trajectory L5 traveled while the mobile robot avoids the obstacle 8.

Gradually, the cleanable area S2 will decrease, and the autonomously traveling mobile robot 1 will travel in a spiral pattern.

Figure 18:
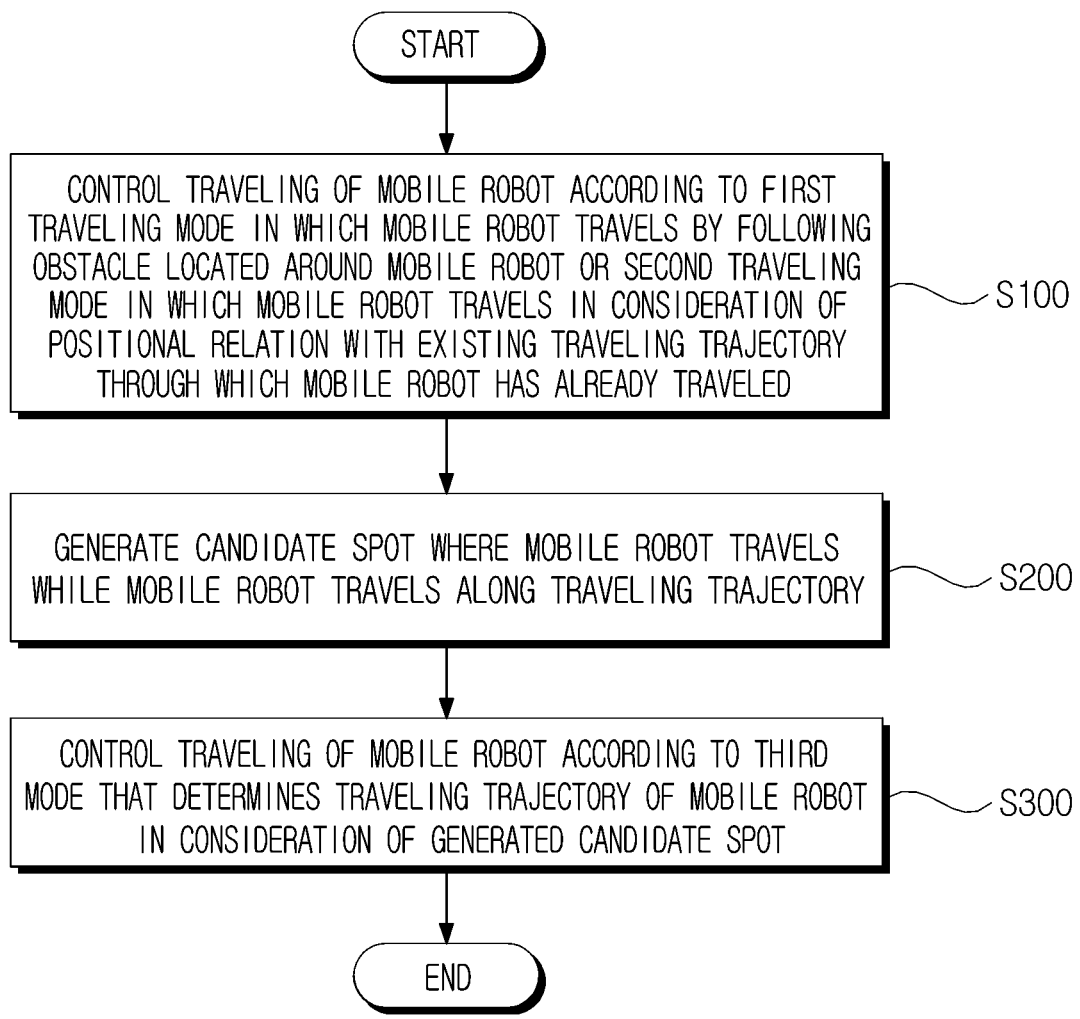
FIGS. 18 and 19 are flowcharts of a traveling control method of the autonomously traveling mobile robot according to the embodiment of the present invention.
Figure 19:
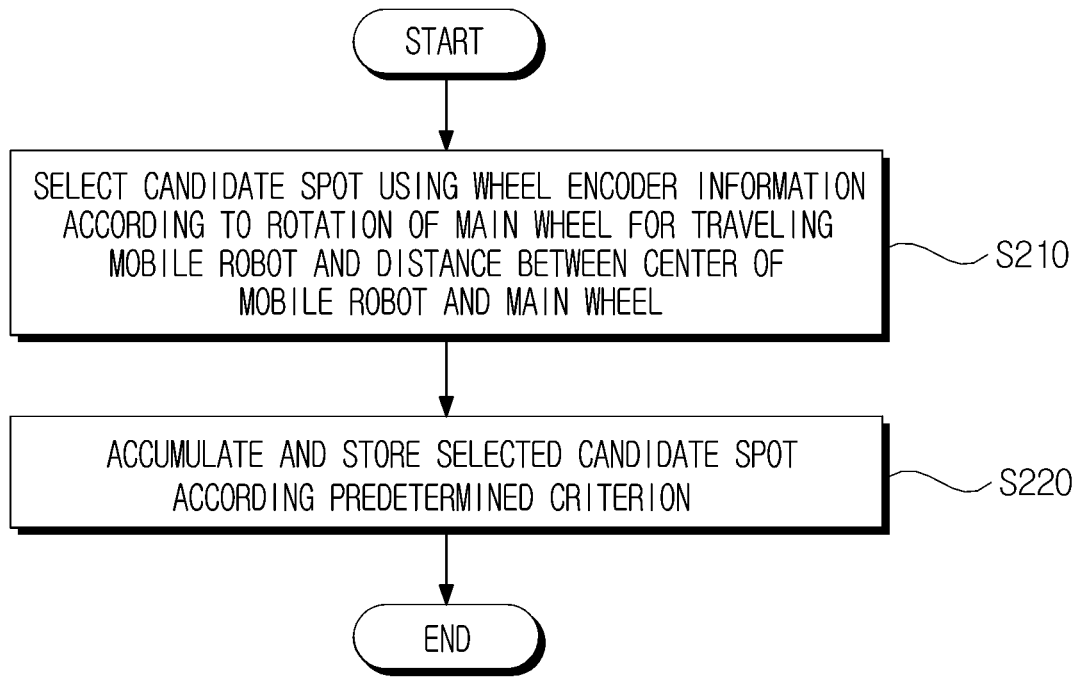

FIGS. 18 and 19 are flowcharts of a traveling control method of an autonomously traveling mobile robot according to an embodiment of the present invention.

Referring to FIG. 18, according to the traveling control method of the autonomously traveling mobile robot according to the embodiment of the present invention, in step S100, the traveling control processor controls the traveling of the mobile robot according to a first traveling mode in which the mobile robot travels by following obstacles located around the mobile robot or a second traveling mode in which the mobile robot travels in consideration of a positional relation with an existing traveling trajectory through which the mobile robot has already traveled.

Here, in the controlling of the traveling of the mobile robot according to the first traveling mode, when the obstacle is detected at a distance closer than a preset distance from a front of the mobile robot, the traveling of the mobile robot is controlled to rotate in a direction in which the speed of the mobile robot is reduced or the radius of curvature of the mobile robot is smaller.

In addition, in the controlling of the traveling of the mobile robot according to the first traveling mode, when the obstacle is detected at a distance closer than a preset distance from one side of the mobile robot, the traveling of the mobile robot is controlled to rotate in place so that the obstacle is located on an opposite side of the mobile robot from the one side.

In addition, when a discontinuity occurs in the detection of the obstacle that the mobile robot follows, the traveling is controlled in consideration of the distance between the obstacle being followed and the mobile robot and the distance between the two wheels of the mobile robot.

In addition, in the controlling of the traveling trajectory of the mobile robot according to the second traveling mode, the traveling of the mobile robot is controlled so that the trajectory according to the first traveling mode in which the mobile robot has already traveled and an overlap according to a predetermined criterion are generated.

In step S200, while the mobile robot travels along the traveling trajectory, a candidate spot where the mobile robot may travel is generated.

In step 300, when the current location of the mobile robot is included in the existing trajectory that the mobile robot has already traveled, or when the obstacle being followed is not detected, the traveling control processor controls the traveling of the mobile robot according to the third traveling mode that determines the traveling trajectory of the mobile robot in consideration of the generated candidate spot.

Here, the traveling control processor selects a candidate spot located closest to the mobile robot from the generated candidate spots and controls the mobile robot to travel to the candidate spot. According to another embodiment of the present invention, even if a candidate spot is a candidate spot closest to the mobile robot, when the candidate spot is in a danger area (an area close to a dynamic obstacle or an area close a stair/cliff) or when the candidate spot is at a different location from a traveling direction in relation to a subsequent destination (or a base station), the traveling control processor may select a candidate spot of a second close area without selecting a candidate spot of a first close area.

Referring to FIG. 19, in relation to the generating of the candidate spot in which the autonomously traveling mobile robot may travel (S200) according to an embodiment of the present invention, in step S210, a candidate spot is selected using wheel encoder information according to the rotation of the main wheel that moves the mobile robot and a distance between the center of the mobile robot and the main wheel.

In step S220, the selected candidate spots are accumulated and stored according to a predetermined criterion.

Here, in the accumulating and storing of the candidate spot according to the predetermined criterion, candidate spots excluding all or some of the candidate spots which overlap the obstacle or are included in the existing trajectory through which the mobile robot has already traveled from the candidate spots are stored. Even if the candidate spot is included in the existing trajectory, there may be cases where it is necessary for the mobile robot to travel along the new trajectory when determining under the current conditions. For example, if the remaining power is insufficient or there is a need for intensive cleaning in a specific area, the traveling trajectory may be determined differently from the existing trajectory, and candidate spots that are likely to be included in the new trajectory may not be excluded even if they are included in the existing trajectory.

In addition, a computer-readable recording medium recorded with a program for executing a traveling control method of an autonomously traveling mobile robot on a computer is provided.

The computer-readable recording medium may include a program command, a data file, a data structure, or the like, alone or a combination thereof. The program commands recorded in the computer-readable recording medium may be especially designed and configured for the invention or be known to those skilled in a field of computer software. Examples of the computer-readable recording medium may include a magnetic medium such as a hard disk, a floppy disk, or a magnetic tape, an optical medium such as a compact disk read only memory (CD-ROM) or a digital versatile disk (DVD), a magneto-optical medium such as a floptical disk, and a hardware device specially configured to store and execute program commands, such as a ROM, a RAM, or a flash memory. Examples of the program commands include a high-level language code capable of being executed by a computer using an interpreter, or the like, as well as a machine language code made by a compiler. The above-described hardware device may be constituted to be operated as one or more software modules to perform an operation according to the present invention, and vice versa.

The above description is only one embodiment of the present invention, and those skilled in the art to which the present invention pertains can be implemented in a modified form within a range that does not depart from the essential characteristics of the present invention. Therefore, the scope of the present invention is not limited to the above-described embodiments and should be construed to include various embodiments within the scope equivalent to the content described in the claims.

The invention claimed is:

1. A traveling control method of an autonomously traveling mobile robot, comprising:
   controlling, by a traveling control apparatus, traveling of the mobile robot according to one traveling mode among a first traveling mode, second traveling mode, and a third traveling mode, so that the mobile robot travels according to a spiral cleaning pattern;
   generating, by the traveling control apparatus, candidate spots to which the mobile robot can move in an area located in a direction perpendicular to a movement trajectory of the mobile robot while the mobile robot travels according to the first traveling mode or the second traveling mode;
   wherein the first traveling mode is a traveling mode in which the mobile robot travels while maintaining a predetermined distance between an obstacle and a side of the mobile robot,
   the second traveling mode is a traveling mode in which the mobile robot travels in consideration of a positional relation with an existing traveling trajectory through which the mobile robot has already traveled while maintaining a predetermined distance from a previous traveling trajectory,
   the third traveling mode is a traveling mode in which the mobile robot moves to a target point determined based on the candidate point,
   the traveling control apparatus changes a current traveling mode of the mobile robot to the first traveling mode when an obstacle located around the mobile robot is detected while the mobile robot is traveling according to the second traveling mode or the third traveling mode, changes the current traveling mode of the mobile robot to the third traveling mode when the mobile robot revisits a previously visited position while the mobile robot is traveling according to the first traveling mode or the second traveling mode, and changes the current traveling mode of the mobile robot to the second traveling mode when the mobile robot arrives at the target point while the mobile robot is traveling according to the third traveling mode.

2. The traveling control method of claim 1, wherein in the controlling of the traveling of the mobile robot according to the first traveling mode, when the obstacle is detected at a distance closer than a preset distance from a front of the mobile robot, the traveling of the mobile robot is controlled to rotate by reducing a speed of the mobile robot or adjusting a radius of curvature of the mobile robot.

3. The traveling control method of claim 1, wherein in the controlling of the traveling of the mobile robot according to the first traveling mode, when the obstacle is detected at a distance closer than a preset distance from one side of the mobile robot, the traveling of the mobile robot is controlled to rotate so that the obstacle is located on an opposite side of the mobile robot from the one side.

4. The traveling control method of claim 1, wherein in the controlling of the traveling of the mobile robot according to the first traveling mode, when the obstacle is discontinuously detected while the mobile robot maintains a predetermined distance from it, the traveling of the mobile robot is controlled to travel in consideration of a distance between the obstacle being maintained a predetermined distance between an obstacle and a side of the mobile robot and the mobile robot and a distance between two wheels of the mobile robot.

5. The traveling control method of claim 1, wherein the generating of the candidate spots includes:
   selecting the candidate spots using wheel encoder information according to a rotation of a main wheel for traveling the mobile robot and a distance between a center of the mobile robot and the main wheel; and
   accumulating and storing the selected candidate spots according to a predetermined criterion.

6. The traveling control method of claim 5, wherein in the accumulating and storing of the selected candidate spots according to the predetermined criterion, candidate spots excluding candidate spots which overlap the obstacle or are included in the existing trajectory through which the mobile robot has already traveled from the candidate spots are stored.

7. The traveling control method of claim 1, wherein the controlling of the traveling of the mobile robot according to the third traveling mode includes selecting candidate spots closest to the mobile robot among the generated candidate spots and controlling the mobile robot to travel to the candidate spots.

8. The traveling control method of claim 1, wherein the controlling of the traveling trajectory of the mobile robot according to the second traveling mode includes controlling the traveling of the mobile robot so that the trajectory according to the first traveling mode in which the mobile robot has already traveled and an overlap according to a predetermined criterion are generated.

9. An autonomously traveling mobile robot, comprising:
   a sensor unit configured to detect an obstacle located around the mobile robot;

a traveling control unit configured to control traveling of the mobile robot according to one traveling mode among a first traveling mode, second traveling mode, and a third traveling mode, so that the mobile robot travels according to a spiral cleaning pattern, and generate candidate spots to which the mobile robot can move in an area located in a direction perpendicular to a movement trajectory of the mobile robot while the mobile robot travels according to the first traveling mode or the second traveling mode; and a driving unit configured to drive the mobile robot according to a traveling command of the traveling control unit, wherein the first traveling mode is a traveling mode in which the mobile robot travels while maintaining a predetermined distance between an obstacle and a side of the mobile robot, the second traveling mode is a traveling mode in which the mobile robot travels in consideration of a positional relation with an existing traveling trajectory through which the mobile robot has already traveled while maintaining a predetermined distance from a previously traveling trajectory, the third traveling mode is a traveling mode in which the mobile robot moves to a target point determined based on the candidate point, the traveling control unit changes a current traveling mode of the mobile robot to the first traveling mode when an obstacle located around the mobile robot is detected while the mobile robot is traveling according to the second traveling mode or the third traveling mode, changes the current traveling mode of the mobile robot to the third traveling mode when the mobile robot revisits a previously visited position while the mobile robot is traveling according to the first traveling mode or the second traveling mode, and changes the current traveling mode of the mobile robot to the second traveling mode when the mobile robot arrives at the target point while the mobile robot is traveling according to the third traveling mode.

10. The autonomously traveling mobile robot of claim 9, wherein when the obstacle is detected at a distance closer than a preset distance from a front of the mobile robot, the traveling control unit controls the traveling of the mobile robot to rotate by reducing a speed of the mobile robot or adjusting a radius of curvature of the mobile robot, and when the obstacle is detected at a distance closer than the preset distance from one side of the mobile robot, the traveling control unit controls the traveling of the mobile robot to rotate so that the obstacle is located on an opposite side of the mobile robot from the one side.

11. The autonomously traveling mobile robot of claim 9, wherein the traveling control unit selects the candidate spots using wheel encoder information according to a rotation of a main wheel for traveling the mobile robot and a distance between a center of the mobile robot and the main wheel and accumulates and stores the selected candidate spots according to a predetermined criterion.

12. The autonomously traveling mobile robot of claim 9, wherein the traveling control unit controls the traveling of the mobile robot so that the trajectory according to the first traveling mode in which the mobile robot has already traveled and an overlap according to a predetermined criterion are generated.

13. A non-transitory computer-readable recording medium having instructions stored therein, which when executed by a processor of a mobile robot, cause the mobile robot to:

controlling, by a traveling control apparatus, traveling of the mobile robot according to one traveling mode among a first traveling mode, second traveling mode, and a third traveling mode, so that the mobile robot travels according to a spiral cleaning pattern;

generating, by the traveling control apparatus, candidate spots to which the mobile robot can move in an area located in a direction perpendicular to a movement trajectory of the mobile robot while the mobile robot travels according to the first traveling mode or the second traveling mode;

wherein the first traveling mode is a traveling mode in which the mobile robot travels while maintaining a predetermined distance between an obstacle and a side of the mobile robot, the second traveling mode is a traveling mode in which the mobile robot travels in consideration of a positional relation with an existing traveling trajectory through which the mobile robot has already traveled while maintaining a predetermined distance from a previously traveling trajectory, the third traveling mode is a traveling mode in which the mobile robot moves to a target point determined based on the candidate point, the traveling control apparatus changes a current traveling mode of the mobile robot to the first traveling mode when an obstacle located around the mobile robot is detected while the mobile robot is traveling according to the second traveling mode or the third traveling mode, changes the current traveling mode of the mobile robot to the third traveling mode when the mobile robot revisits a previously visited position while the mobile robot is traveling according to the first traveling mode or the second traveling mode, and changes the current traveling mode of the mobile robot to the second traveling mode when the mobile robot arrives at the target point while the mobile robot is traveling according to the third traveling mode.

14. The non-transitory computer-readable recording medium of claim 13, wherein in the controlling of the traveling of the mobile robot according to the first traveling mode, when the obstacle is detected at a distance closer than a preset distance from a front of the mobile robot, the traveling of the mobile robot is controlled to rotate by reducing a speed of the mobile robot or adjusting a radius of curvature of the mobile robot.

15. The non-transitory computer-readable recording medium of claim 13, wherein in the controlling of the traveling of the mobile robot according to the first traveling mode, when the obstacle is detected at a distance closer than a preset distance from one side of the mobile robot, the traveling of the mobile robot is controlled to rotate so that the obstacle is located on an opposite side of the mobile robot from the one side.

16. The non-transitory computer-readable recording medium of claim 13, wherein in the controlling of the traveling of the mobile robot according to the first traveling mode, when the obstacle is discontinuously detected while the mobile robot maintains a predetermined distance from it, the traveling of the mobile robot is controlled to travel in consideration of a distance between the obstacle being maintained a predetermined distance between an obstacle and a side of the mobile robot and the mobile robot and a distance between two wheels of the mobile robot.

17. The non-transitory computer-readable recording medium of claim 13, wherein the non-transitory computer-readable recording medium includes further instructions to generate candidate spots where the mobile robot travels, which when executed by the processor cause the mobile robot to:

select the candidate spots using wheel encoder information according to a rotation of a main wheel for traveling the mobile robot and a distance between a center of the mobile robot and the main wheel; and accumulate and store the selected candidate spots according to a predetermined criterion.

\* \* \* \* \*